(12) United States Patent
Kim et al.

(10) Patent No.: US 12,501,096 B2
(45) Date of Patent: Dec. 16, 2025

(54) ELECTRONIC APPARATUS AND CONTROLLING METHOD THEREOF

(71) Applicant: Samsung Electronics Co., Ltd., Suwon-si (KR)

(72) Inventors: Minsoo Kim, Suwon-si (KR); Taehun Kim, Suwon-si (KR); Eunkyu Oh, Suwon-si (KR); Yunhu Ji, Suwon-si (KR); Sushil Khyalia, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 17/966,237

(22) Filed: Oct. 14, 2022

(65) Prior Publication Data

US 2023/0110006 A1  Apr. 13, 2023

Related U.S. Application Data

(63) Continuation of application No. PCT/KR2022/007406, filed on May 25, 2022.

(30) Foreign Application Priority Data

Oct. 8, 2021 (KR) .................. 10-2021-0133651

(51) Int. Cl.
- *H04N 5/445* (2011.01)
- *H04N 21/25* (2011.01)
- *H04N 21/2668* (2011.01)

(52) U.S. Cl.
CPC ....... *H04N 21/2668* (2013.01); *H04N 21/251* (2013.01)

(58) Field of Classification Search
CPC ............ H04N 21/2668; H04N 21/251; H04N 21/4826; G06N 3/045; G06N 3/08
See application file for complete search history.

(56) References Cited

U.S. PATENT DOCUMENTS

| 8,887,095 B2 | 11/2014 | Krishnamurthy et al. |
| 9,454,530 B2 | 9/2016 | Sabah et al. |

(Continued)

FOREIGN PATENT DOCUMENTS

| CN | 111368203 A | 7/2020 |
| CN | 112685640 A | 4/2021 |

(Continued)

OTHER PUBLICATIONS

Shiwen Wu et al., "Graph Neural Networks in Recommender Systems: A Survey", Apr. 2021.

(Continued)

*Primary Examiner* — Annan Q Shang
(74) *Attorney, Agent, or Firm* — Jefferson IP Law, LLP

(57) ABSTRACT

An electronic apparatus is provided. The electronic apparatus includes a memory configured to store at least one command and a processor connected to the memory and configured to control the electronic apparatus. The processor is configured to, by executing the at least one command, obtain graph information for a plurality of users in which viewing content is arranged in a time sequence based on content viewing history information for a plurality of users, obtain attribute information for each content by inputting the graph information for the plurality of users to a Graph Neural Network (GNN) model, group the plurality of users into a plurality of viewing groups based on the graph information for the plurality of users and the attribute information for each content, and provide a recommended content based on content information corresponding to the plurality of viewing groups.

16 Claims, 22 Drawing Sheets

(56) References Cited

U.S. PATENT DOCUMENTS

| | | | |
|---|---|---|---|
| 9,817,827 B2 | 11/2017 | Gomez Uribe et al. | |
| 10,552,470 B2 | 2/2020 | Todd et al. | |
| 10,679,012 B1* | 6/2020 | Salimov | G06N 3/088 |
| 10,698,944 B2 | 6/2020 | Stipins, III | |
| 11,080,596 B1* | 8/2021 | Makhijani | G06F 7/523 |
| 11,228,810 B1* | 1/2022 | Arazi | H04N 21/6582 |
| 11,551,803 B1* | 1/2023 | Arazi | G16H 50/70 |
| 11,551,807 B2* | 1/2023 | Adiri | G06T 7/70 |
| 11,838,579 B2* | 12/2023 | Van Os | H04N 21/2541 |
| 12,368,911 B1* | 7/2025 | Arazi | H04N 21/251 |
| 2014/0236969 A1 | 8/2014 | Nam et al. | |
| 2014/0350424 A1* | 11/2014 | Du | A61B 5/7264 |
| | | | 600/523 |
| 2016/0134576 A1* | 5/2016 | Ju | H04L 51/52 |
| | | | 709/204 |
| 2017/0083198 A1* | 3/2017 | Raskin | G06F 3/02 |
| 2017/0208370 A1* | 7/2017 | Ray | H04N 21/266 |
| 2017/0251260 A1 | 8/2017 | Sanders | |
| 2017/0289593 A1* | 10/2017 | Li | H04N 21/2408 |
| 2019/0373332 A1* | 12/2019 | Kim | G06N 20/20 |
| 2020/0143261 A1* | 5/2020 | Morgan | G06N 3/042 |
| 2020/0221179 A1* | 7/2020 | Kim | H04N 21/4312 |
| 2020/0228880 A1* | 7/2020 | Iyer | H04N 21/23424 |
| 2021/0201146 A1* | 7/2021 | Yoon | G06N 5/046 |
| 2022/0366265 A1* | 11/2022 | Saad | G06Q 30/0202 |
| 2023/0334338 A1* | 10/2023 | Moon | G06N 5/02 |

FOREIGN PATENT DOCUMENTS

| | | |
|---|---|---|
| JP | 2014-200007 A | 10/2014 |
| KR | 10-2014-0104536 A | 8/2014 |
| KR | 10-2015-0061700 A | 6/2015 |
| KR | 10-1647364 B1 | 8/2016 |
| KR | 10-2021-0018384 A | 2/2021 |
| KR | 10-2214422 B1 | 2/2021 |
| KR | 10-2021-0051349 A | 5/2021 |
| KR | 10-2021-0097432 A | 8/2021 |

OTHER PUBLICATIONS

Jisun Jung et al. "Analysis on Research Trend of Graph Neural Network". Fall Annual Conference of Korean Institute of Smart Media, 2020. p. 1-4. Nov. 20, 2020.

* cited by examiner

FIG. 5
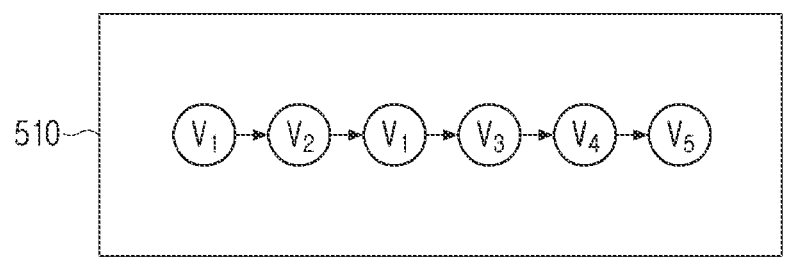
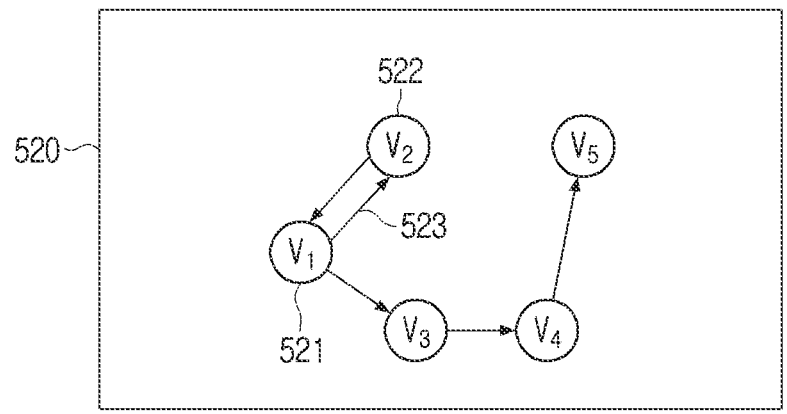

FIG. 10
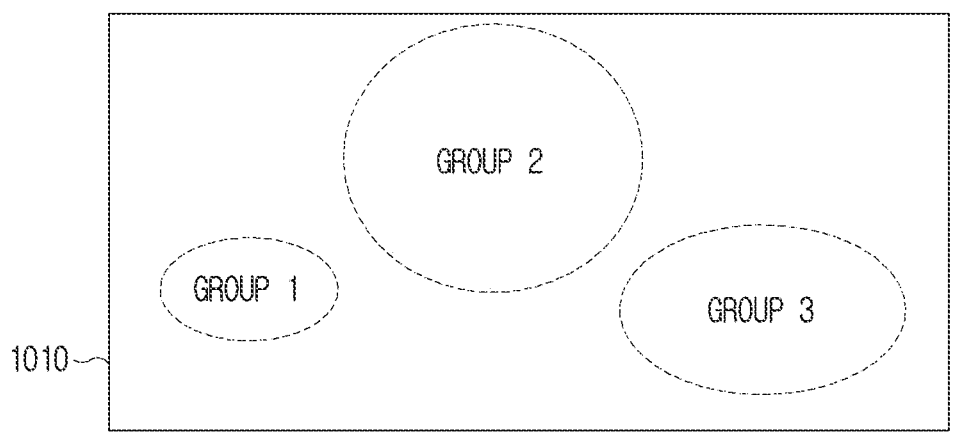
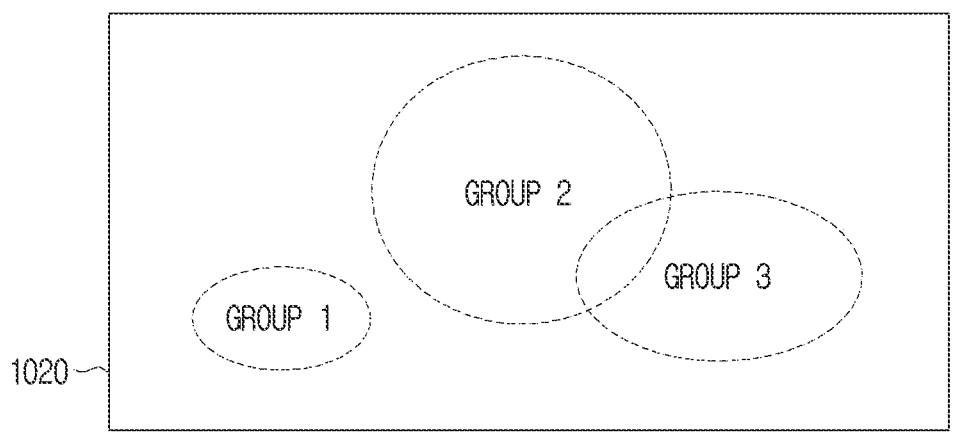

FIG. 12

| | t1 | t2 | t3 |
|---|---|---|---|
| USER 1 | v1 0.1<br>v2 0.2<br>v3 0.1<br>v4 0.2<br>v5 0.5 | v1 0.1<br>v2 0.2<br>v3 0.1<br>v4 0.2<br>v5 0.4 | v1 0.1<br>v2 0.2<br>v3 0.1<br>v4 0.2<br>v5 0.6 |
| USER 2 | v1 0.1<br>v2 0.2<br>v3 0.5<br>v4 0.2<br>v5 0.1 | v1 0.1<br>v2 0.2<br>v3 0.5<br>v4 0.2<br>v5 0.1 | v1 0.1<br>v2 0.2<br>v3 0.5<br>v4 0.2<br>v5 0.1 |
| USER 3 | v1 0.1<br>v2 0.1<br>v3 0.1<br>v4 0.1<br>v5 0.6 | v1 0.1<br>v2 0.1<br>v3 0.1<br>v4 0.1<br>v5 0.5 | v1 0.1<br>v2 0.1<br>v3 0.1<br>v4 0.1<br>v5 0.6 |

1210

ELECTRONIC APPARATUS AND CONTROLLING METHOD THEREOF

CROSS-REFERENCE TO RELATED APPLICATION(S)

This application is a continuation application, claiming priority under § 365(c), of an International application No. PCT/KR2022/007406, filed on May 25, 2022, which is based on and claims the benefit of a Korean patent application number 10-2021-0133651, filed on Oct. 8, 2021, in the Korean Intellectual Property Office, the disclosure of which is incorporated by reference herein in its entirety.

TECHNICAL FIELD

The disclosure relates to an electronic apparatus and a controlling method thereof. More particularly, the disclosure relates to an electronic apparatus that provides a content to be recommended to a user and a controlling method thereof.

BACKGROUND ART

A content providing service can provide a recommended content by analyzing a user's viewing habits beyond providing the content. In this case, the user's viewing history is used to determine the recommended content. For example, if it is determined that the first user likes sports, an electronic apparatus may provide a content related to sports to the first user.

If the number of content varies in the operation of determining recommended content, it may be difficult to recommend content that is not reflected in the viewing history.

In addition, if time information is not reflected in determining recommended content, there is a problem in that preferences that vary depending on the user's viewing time cannot be reflected.

Further, in case where only the viewing history of one user is considered in the operation of determining recommended content, there is a problem in that various types of content cannot be recommended.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an electronic apparatus that provides recommended content based on graph information corresponding to viewing history information and a plurality of viewing groups and a controlling method thereof.

Additional aspects will be set forth in part in the description which follows and, in part, will be apparent from the description, or may be learned by practice of the presented embodiments.

Technical Solution

In accordance with an aspect of the disclosure, an electronic apparatus is provided. The electronic apparatus includes a memory configured to store at least one command and a processor connected to the memory and configured to control the electronic apparatus, wherein the processor is configured to, by executing the at least one command, obtain graph information for a plurality of users in which viewing content is arranged in a time sequence based on content viewing history information for a plurality of users, obtain attribute information for each content by inputting the graph information for the plurality of users to a Graph Neural Network (GNN) model, group the plurality of users into a plurality of viewing groups based on the graph information for the plurality of users and the attribute information for each content, and provide a recommended content based on content information corresponding to the plurality of viewing groups.

The processor may be configured to obtain prediction information for each content for each of the plurality of users based on graph information for the plurality of users and weighted value information for each of the plurality of viewing groups, obtain content information corresponding to the plurality of viewing groups based on the prediction information for content for each of the plurality of users, and provide a recommended content based on the obtained content information.

The attribute information for each content may include information regarding a viewing pattern.

The processor may be configured to provide a User Interface (UI) including a text corresponding to the attribute information for each content related to a viewing pattern and information related to the recommended content.

The processor may be configured to obtain a representative value for a plurality of users corresponding to graph information for the plurality of users and group the plurality of users into a plurality of viewing groups by comparing a plurality of representative values corresponding to the plurality of viewing groups with a representative value for each of the plurality of users.

The processor may be configured to, based on a predetermined event being received from a terminal apparatus through the communication interface, provide recommended user information corresponding to the plurality of viewing groups for a joint viewing function.

The processor may be configured to, based on a predetermined event being received from a terminal apparatus through the communication interface, identify a viewing group corresponding to the terminal apparatus and provide at least one user information corresponding to the identified viewing group as recommended user information.

The processor may be configured to, based on a predetermined event being received from a terminal apparatus through the communication interface, generate a UI including the recommended content and the recommended user information and transmit the generated UI to the terminal apparatus.

The predetermined event may include at least one of an event in which a recommended content is provided, an event in which a user command for joint viewing is received, an event in which a content that is currently viewed is terminated, or an event in which a user input for viewing a new content is received.

The graph neural network model may be a model trained by using at least one viewing content that has been viewed by a plurality of users as input learning data and using a viewing content that has been viewed by a plurality of users after viewing the at least one viewing content as output learning data.

In accordance with another aspect of the disclosure, a controlling method of an electronic apparatus is provided. The controlling method includes obtaining graph information for a plurality of users in which viewing content is arranged in a time sequence based on content viewing history information for a plurality of users, obtaining attribute information for each content by inputting the graph information for the plurality of users to a Graph Neural Network (GNN) model, grouping the plurality of users into a plurality of viewing groups based on the graph information for the plurality of users and the attribute information for each content, and providing a recommended content based on content information corresponding to the plurality of viewing groups.

The providing of the recommended content may include obtaining prediction information for each content for each of the plurality of users based on graph information for the plurality of users and weighted value information for each of the plurality of viewing groups, obtaining content information corresponding to the plurality of viewing groups based on the prediction information for content for each of the plurality of users, and providing a recommended content based on the obtained content information.

The attribute information for each content may include information regarding a viewing pattern.

The method further includes providing a User Interface (UI) including a text corresponding to the attribute information for each content related to a viewing pattern and information related to the recommended content.

The grouping may include obtaining a representative value for a plurality of users corresponding to graph information for the plurality of users and grouping the plurality of users into a plurality of viewing groups by comparing a plurality of representative values corresponding to the plurality of viewing groups with a representative value for each of the plurality of users.

The method may include, based on a predetermined event being received from a terminal apparatus, providing recommended user information corresponding to the plurality of viewing groups for a joint viewing function.

The method may further include, based on a predetermined event being received from a terminal apparatus, identifying a viewing group corresponding to the terminal apparatus and providing at least one user information corresponding to the identified viewing group as recommended user information.

The method may further include, based on a predetermined event being received from a terminal apparatus, generating a UI including the recommended content and the recommended user information and transmitting the generated UI to the terminal apparatus.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 5 is a view provided to explain graph information according to an embodiment of the disclosure;

FIG. 10 is a view provided to explain an embodiment in which a viewing group is defined according to an embodiment of the disclosure;

FIG. 12 is a view provided to explain prediction information for each content for each of a plurality of users according to an embodiment of the disclosure;

The same reference numerals are used to represent the same elements throughout the drawings.

MODE FOR INVENTION

Figure 1:
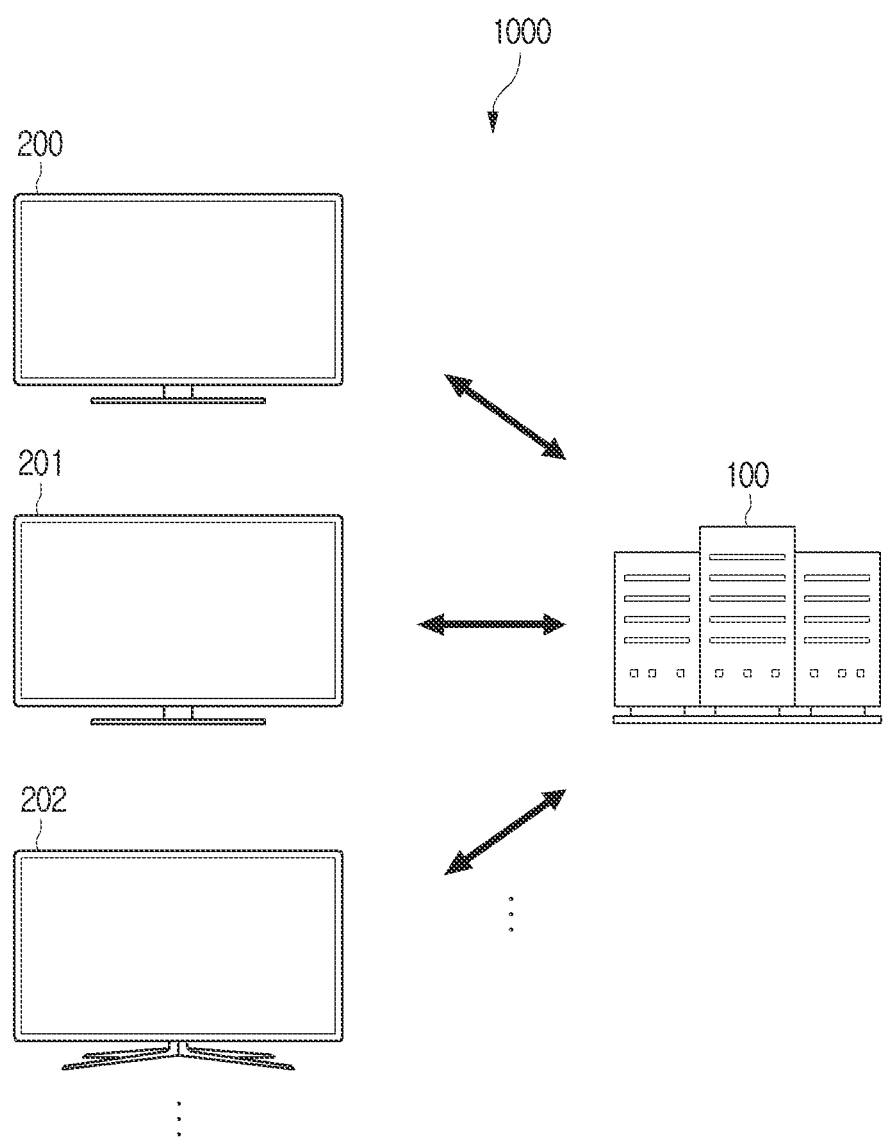
FIG. 1 is a view provided to explain a system including an electronic apparatus and a plurality of terminal apparatuses according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, an expression "have", "may have", "include", "may include", or the like, indicates an existence of a corresponding feature (for example, a numerical value, a function, an operation, a component such as a part, or the like), and does not exclude an existence of an additional feature.

The expression "at least one of A and/or B" should be understood to represent either "A" or "B" or any one of "A and B".

Expressions such as "first," or "second," used in the disclosure may modify various components regardless of order and/or importance, and are used to distinguish one component from another component, and do not limit the corresponding components.

When it is mentioned that any component (e.g., a first component) is (operatively or communicatively) coupled with/to or is connected to another component (e.g., a second component), it is to be understood that any component is directly coupled to another component or may be coupled to another component through another component (e.g., a third component).

Singular expressions include plural expressions unless the context clearly indicates otherwise. It should be further understood that the term "include" or "constituted" used in the application specifies the presence of features, numerals, steps, operations, components, parts mentioned in the specification, or combinations thereof, but do not preclude the presence or addition of one or more other features, numerals, steps, operations, components, parts, or combinations thereof.

In the disclosure, a 'module' or a 'unit' may perform at least one function or operation, and be implemented by hardware or software or be implemented by a combination of hardware and software. In addition, a plurality of 'modules' or a plurality of 'units' may be integrated in at least one module and be implemented as at least one processor (not illustrated) except for a 'module' or an 'unit' that needs to be implemented by specific hardware.

In the disclosure, a term "user" may be a person that uses the electronic apparatus or an apparatus (e.g., an artificial intelligence electronic apparatus) that uses the electronic apparatus.

Hereinafter, an embodiment of the disclosure will be described in more detail with reference to the accompanying drawings.

FIG. 1 is a view provided to explain a system including an electronic apparatus and a plurality of terminal apparatuses according to an embodiment of the disclosure.

Referring to FIG. 1, the system 1000 may include the electronic apparatus 100 and the plurality of terminal apparatuses 200, 201, 202. The system 1000 may be a system that provides a service of displaying a recommended content based on viewing history information.

The electronic apparatus 100 may be an apparatus that identifies a recommended content for at least one terminal apparatus using an artificial intelligence model. The artificial intelligence model may be a Graph Neural Network (GNN) model. In this case, the electronic apparatus 100 may identify a recommended content corresponding to each of the plurality of terminal apparatuses 200, 201, 202 based on viewing history information received from the plurality of terminal apparatuses 200, 201, 202 and provide the identified recommended content to each of the plurality of terminal apparatuses 200, 201, 202.

The plurality of terminal apparatuses 200, 201, 202 may mean apparatuses that display content. For example, the plurality of terminal apparatuses 200, 201, 202 may mean an apparatus including at least one of a display or a speaker. The plurality of terminal apparatuses 200, 201, 202 may generate viewing history information of a user and transmit the viewing history information to the electronic apparatus 100. In addition, the plurality of terminal apparatuses 200, 201, 202 may receive a recommended content from the electronic apparatus 100.

While FIG. 1 illustrates three terminal apparatuses, according to various embodiments of the disclosure, different numbers of terminal apparatuses may be provided.

Figure 2:
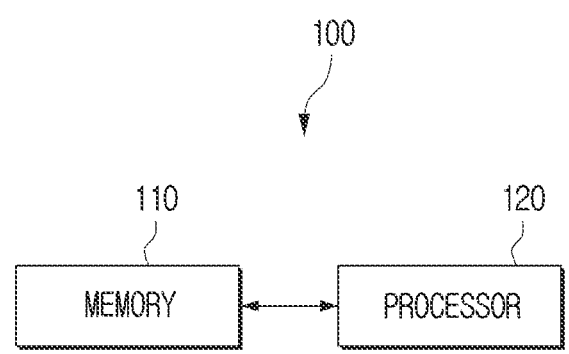
FIG. 2 is a block diagram illustrating an electronic apparatus according to an embodiment of the disclosure.

FIG. 2 is a block diagram illustrating an electronic apparatus according to an embodiment of the disclosure.

Referring to FIG. 2, the electronic apparatus 100 may include a memory 110 and a processor 120.

The electronic apparatus 100 may mean a server that provides content.

The electronic apparatus 100 according to various embodiments of the disclosure may include at least one of, for example, a smartphone, a tablet personal computer (PC), a mobile phone, a desktop PC, a laptop PC, a personal digital assistant (PDA), or a portable multimedia player (PMP). In some embodiments, the electronic apparatus 100 may include at least one of, for example, a television, a digital video disk (DVD) player, or a media box (e.g., Samsung HomeSync™, Apple TV™, or Google TV™).

The memory 110 may be implemented as an internal memory such as a ROM (e.g., electrically erasable programmable read-only memory (EEPROM)) or a RAM included in the processor 120, or implemented as a memory separate from the processor 120. In this case, the memory 110 may be implemented in the form of a memory embedded in the electronic apparatus 100 or in the form of a memory attachable to and detachable from the electronic apparatus 100, depending on the purpose of data storage. For example, data for driving the electronic apparatus 100 may be stored in the memory embedded in the electronic apparatus 100, and data for extended function of the electronic apparatus 100 may be stored in the memory attachable to and detachable from the electronic apparatus 100.

The memory embedded in the electronic apparatus 100 may be implemented as at least one of a volatile memory (e.g., a dynamic random access memory (DRAM), a static RAM (SRAM), a synchronous dynamic RAM (SDRAM), or the like), or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, a NOR flash, or the like), a hard drive, or a solid state drive (SSD)), and the memory attachable to and detachable from the electronic apparatus 100 may be implemented in the form such as a memory card (e.g., a compact flash (CF), a secure digital (SD), a micro secure digital (Micro-SD), a mini secure digital (Mini-SD), an extreme digital (xD), a multi-media card (MMC), or the like), an external memory (e.g., a USB memory) connectable to a USB port, or the like.

The memory 110 may store one or more instructions. The processor 120 may perform various operations based on the instructions stored in the memory 110.

The processor 120 may perform the overall control operations of the electronic apparatus 100. The processor 120 performs the function of controlling the overall operations of the electronic apparatus 100.

The processor 120 may be implemented as a digital signal processor (DSP), a microprocessor, or a time controller (TCON) that processes a digital signal. However, the processor 120 is not limited thereto, but may include one or more of a central processing unit (CPU), a micro controller unit (MCU), a micro processing unit (MPU), a controller, an application processor (AP), a graphics-processing unit (GPU), a communication processor (CP), and an ARM processor, or may be defined as the corresponding term. In addition, the processor 120 may also be implemented as a system-on-chip (SoC) or a large scale integration (LSI) in which a processing algorithm is embedded, and may also be implemented in the form of a field programmable gate array (FPGA). In addition, the processor 120 may perform various functions by executing computer executable instructions stored in the memory 110.

The processor 120 may be connected to the memory 110 to control the electronic apparatus 100. The processor 120 may, by executing at least one command, obtain graph information for each of a plurality of users in which viewing content is arranged in a time sequence based on content viewing history information for each of a plurality of users, obtain attribute information for each content by inputting graph information for each of the plurality of users to a Graph Neural Network (GNN) model 123, group the plurality of users into a plurality of viewing groups based on the graph information for each of the plurality of users and the attribute information for each content, and provide a recommended content based on content information corresponding to the plurality of viewing groups.

The graph neural network model 123 may mean a neural network model trained by using graph information that is data in the form of a graph. In addition, the graph neural network model 123 may perform a node classification operation included in graph information. A classification algorithm may be used for the node classification operation.

The graph information may include an edge which connects a plurality of nodes and a plurality of nodes. The node may mean a dot, and the edge may mean a line (or a link). The node may mean a content, and the edge may mean a connection relationship according to a time sequence. For example, graph information composed of A node-edge-B node may represent that B content was viewed after A content was viewed.

The processor 120 may obtain content viewing history information for each of a plurality of users. The content viewing history information may include information in which a viewing record is stored according to a time sequence. The content viewing history information may include information indicating which content the user viewed at which point in time. For example, assume that the first user watched the content of drama A at 9 am on Saturday, the content of movie B at 10 am on Saturday, and the content of animation C at 11 am on Saturday. In this case, the content viewing history information may include all information indicating that the user watched the content of drama A at 9 am on Saturday, information indicating that the content of movie B at 10 am on Saturday, and information indicating that the content of animation C at 11 am on Saturday.

The processor 120 may receive content viewing history information for each of a plurality of users from the plurality of terminal apparatuses 200, 201, 202. In this case, the electronic apparatus 100 may include a communication interface 130, and the processor 120 may control the communication interface 130 to receive information from the plurality of terminal apparatuses 200, 201, 202.

The processor 120 may obtain graph information for each of the plurality of users based on the content viewing history information received from the plurality of terminal apparatuses 200, 201, 202. The graph information may mean information in which viewing content is arranged in a time sequence. For example, the graph information may mean information in which drama A-movie B-animation C are displayed in the form of a continuous graph. The graph information may include time information as well as the sequence of the viewing content. Here, the operation of obtaining graph information may correspond to a data pre-processing operation.

The processor 120 may input graph information for each of a plurality of users to the graph neural network model 123 as input data. The graph neural network model 123 may mean a network that obtains output data by analyzing information (graph information) configured in the form of a graph.

Meanwhile, the processor 120 may obtain attribute information for each content using the neural network model 123. The processor 120 may obtain attribute information for each content by inputting graph information for each of a plurality of users to the graph neural network model 123.

The attribute information for each content may include information related to a viewing pattern. In addition, the attribute information for each content may be information determined by other content that was viewed before and after viewing of a specific content. Specifically, the attribute information for each content may be information obtained by inputting graph information in which a specific content is arranged in a time sequence to the graph neural network model 123. The attribute information for each content may be determined according to a first node corresponding to a specific content included in the graph information and other content located in another node adjacent to the first node.

The attribute information for each content may further include information regarding at least one of a content viewing time, a viewing duration, a name, a genre, a country, a language, an actor, a producer, or a director.

The processor 120 may obtain attribute information for each content based on detailed information regarding content viewing. The detailed information regarding content viewing may include at least one of a content viewing time, viewing duration, a name, a genre, a country, a language, an actor, a producer, or a director.

With respect to the viewing time, the processor 120 may identify that the first user has a pattern of mainly viewing content in the morning. In addition, the processor 120 may identify that the second user has a pattern of mainly viewing content in the afternoon.

With respect to the viewing duration, the processor 120 may identify that the first user has a pattern of continuously viewing content for one hour. In addition, the processor 120 may identify that the second user has a pattern of continuously viewing content for three hours.

With respect to the content genre, the processor 120 may identify that the first user has a pattern of mainly viewing dramas. In addition, the processor 120 may identify that the second user has a pattern of mainly viewing sports content.

With respect to the content country, the processor 120 may identify that the first user has a pattern of mainly viewing content produced in Korea. In addition, the processor 120 may identify that the second user has a pattern of mainly viewing content produced in the United States.

With respect to the content language, the processor 120 may identify that the first user has a pattern of mainly viewing content provided in Korean. In addition, the processor 120 may identify that the second user has a pattern of mainly viewing content provided in English. The content language may include at least one of an audio language or a subtitle language.

With respect to the content actor, the producer, the director, etc., the processor 120 may identify that the first user has a pattern of mainly viewing content in which actor A appears. In addition, the processor 120 may identify that the second user has a pattern of mainly viewing content in which actor B appears.

The processor 120 may group a plurality of users into a plurality of viewing groups using the graph neural network model 123.

Specifically, the processor 120 may divide or classify a plurality of users into predetermined groups based on graph information for each of the plurality of users and attribute information for each content. The predetermined groups may be groups set by a system manager of the electronic apparatus 100.

For example, assume that the predetermined group is the first group that views sports content in the morning, the second group that views drama content in the morning, and the third group that views news content in the afternoon. In this example, the processor 120 may identify which group the first user belongs to among the first group to the third group by analyzing content viewing history information of the first user. If the first user views sports content in the morning more than five days in a week, the processor 120 may identify that the first user belongs to the first group.

The processor 120 may identify which group among the predetermined groups a plurality of users belong to based on content viewing history information for each of the plurality of users. The processor 120 may obtain a probability value that a user belongs to each of the plurality of predetermined groups. In addition, the processor 120 may identify a group having the highest probability value among probability values that the user would belong to each of the plurality of groups.

For example, the processor 120 may identify that a user belongs to a group having the highest probability value. For example, assume that the probability value that the first user belongs to the first group is 0.1, the probability value that the first user belongs to the second group is 0.5, and the probability value that the first user belongs to the third group is 0.2. In this example, the processor 120 may identify that the first user belongs to the second group (the group having the maximum probability value).

In another example, if the highest probability value is equal to or greater than a threshold value, the processor 120 may identify that the user belongs to the group having the highest probability value. For example, assume that the probability value that the first user belongs to the first group is 0.1, the probability value that the first user belongs to the second group is 0.5, the probability value that the first user belongs to the third group is 0.2, and the threshold value is 0.6. Since the probability value that the first user belongs to the second group is not greater than the threshold value, the processor 120 may determine that the first user does not belong to any of the groups. The processor 120 may output a content that the first user does not belong to the predetermined first group to third group or may set the fourth group as a group for users who cannot be analyzed.

The processor 120 may group a plurality of users into a predetermined groups and store the grouping result in the memory 110. The grouping result may mean information indicating which user belongs to a specific group. For example, the first group may include the $1^{st}$ user to the $10^{th}$ user, the second group may include the $11^{th}$ user to the $20^{th}$ user, and the third group may include the $21^{st}$ user to the $30^{th}$ user.

After grouping a plurality of users into a plurality of viewing groups, the processor 120 may provide the plurality of users with a recommended content based on content information corresponding to a viewing group.

The same group may be a group of users having the same viewing pattern. Thus, in the same group, users have similar viewing patterns and thus, the preferred content may be similar. Accordingly, the processor 120 may provide the plurality of users with an appropriate recommended content using content information corresponding to a viewing group.

For example, the processor 120 may recommend the same content to users who belong to the same group. In another example, the processor 120 may recommend somewhat different content to users who belong to the same group.

The processor 120 may obtain prediction information for each content for each of a plurality of users based on graph information for the plurality of users and weighted information corresponding to each of a plurality of viewing groups, obtain content information corresponding to the plurality of viewing groups based on prediction information for each content for each of the plurality of users, and provide a recommended content based on the obtained content information.

The prediction information for each content for each of the plurality of users may mean a predicted probability value for each of a plurality of predetermined content. For example, assume that the first user views the content of drama A at 9 am on Saturday, the content of movie B at 10 am on Saturday, and the content of animation C at 11 am on Saturday. There is a need to infer which content the first user viewed after viewing content C. Accordingly, the prediction information for each content may mean a probability value for predicting which content the first user will view. The prediction information for each content may include content A (0.01), content B (0.02), content C (0.03), content D (0.4), content E (0.3), etc. If the predetermined content is content A to content E, the first user may have the highest probability of viewing content D. Thus, the processor 120 may provide the user with content D as a recommended content.

The processor 120 may provide a User Interface (UI) including a text corresponding to attribute information for each content related to a viewing pattern and information related to a recommended content.

The processor 120 may generate a UI for providing a user with a recommended content. Subsequently, the processor 120 may provide the generated UI to the user. The processor 120 may transmit the generated UI to the terminal apparatus 200 of the user, and the terminal apparatus 200 may provide the UI to the user by displaying the UI received from the electronic apparatus 100.

The text corresponding to attribute information for each content may mean a text including a result of analyzing a specific user's viewing pattern. For example, the text corresponding to attribute information for each content may include "Your viewing pattern is morning-sports."

The information regarding a recommended content may mean summary information representing the recommended content. The information regarding a recommended content may include at least one of a name of the recommended content, a thumbnail image, a playback time, or a playback count. The user may decide whether to view the recommend content after reviewing the information regarding the recommended content.

The processor 120 may obtain a representative value for each of a plurality of users corresponding to graph information for each of the plurality of users, and group the plurality of users into a plurality of viewing groups by comparing a plurality of representative values corresponding to the plurality of viewing groups with the plurality of representative values for each of the plurality of users.

The content viewing history information may be changed to graph information through a data pre-processing operation. In addition, the processor 120 may obtain a representative value of each of the plurality of users using the graph information. The representative value of the users may mean a value for representing graph information of a specific user. The representative value of the users may be compared with the representative value of a plurality of predetermined viewing groups. The processor 120 may determine to which group a user belongs by comparing the representative value of the user and the representative value of the predetermined group.

The processor 120 may obtain a representative value for each of a plurality of users based on graph information for each of the plurality of users. The processor 120 may group the plurality of users into a plurality of viewing groups by comparing the representative value for each of the plurality of users with the representative value for each of the plurality of viewing groups.

The processor 120 may provide recommended user information corresponding to the plurality of viewing groups.

When a predetermined event is received from a terminal apparatus, a viewing group corresponding to the terminal apparatus may be identified, and at least one user information corresponding to the identified viewing group may be provided as recommended user information.

The predetermined event may include at least one of an event in which a recommended content is provided, an event in which a user command for joint viewing is received, an event in which a content that is currently being viewed is terminated, or an event in which a user input for viewing a new content is received.

The joint viewing may mean a service in which a plurality of users view a specific content simultaneously. In addition, the joint viewing may mean a service in which a plurality of users have a voice conversation or a visual conversation while viewing a specific content simultaneously.

The recommend user information may mean information for selecting a counterpart to use the joint viewing service together. For example, the recommend user information may mean profile information including at least one of a user name, an ID or a thumbnail image.

The recommend user information may be obtained based on information in which a plurality of users are grouped into a plurality of viewing groups. The processor 120 may specify a user to whom the recommended user information should be provided, and identify a viewing group to which the specified user belongs. In addition, the processor 120 may provide information related to least one user included in the viewing group to which the user belongs.

For example, assume that a first group includes a $1^{st}$ user to a $10^{th}$ user, a second group includes an $11^{th}$ user to a $20^{th}$ user, and a third group includes a $21^{st}$ user to a $30^{th}$ user. If it is identified that a specific user belongs to the second group, the processor 120 may recommend the $11^{th}$ user to the $20^{th}$ user included in the second group to the specific user.

The processor 120 may provide a user with various services by providing recommended user information for joint viewing together with a recommended content.

When a predetermined event is received from the terminal apparatus 200 through the communication interface 130, the processor 120 may generate a UI including a recommended content and recommended user information and transmit the generated UI to the terminal apparatus 200.

A detailed description regarding the UI will be provided with reference to FIGS. 15 to 19.

The graph neural network model 123 may be a model that is trained using at least one content viewed by the plurality of users as input learning data and using a viewing content viewed by the plurality of users after viewing the at least one viewing content as output learning data. Detailed description related to the graph neural network model 123 will be provided with reference to FIGS. 3 to 12.

Although an operation related to a viewing content is described above, according to various embodiments of the disclosure, the feature of the disclosure may be applied to various embodiments regarding any data including a time sequence. For example, a purchased item may be used instead of a viewing content. For example, instead of content viewing history information for viewing a first content, a second content and a third content sequentially, item purchase history information for purchasing a first item, a second item and a third item may be used. Instead of prediction information for each content, prediction information for each item may be obtained.

The disclosure may generate prediction information for each content using group information related to a plurality of viewing groups. When group information is not used, only connection information for each node is used, so a case having a similar probability value may occur. However, the disclosure generates prediction information for each content using group information, so it is possible to perform the operation of determining a recommended content accurately.

The disclosure may provide a function or a service for joint viewing in addition to a recommended content. By recommending a user for jointly viewing a recommended content, a user may use a joint viewing function regarding the recommended content. Here, the group information used to determine a recommended content may be used to recommend suitable users for the user.

Only simple configuration of the electronic apparatus 100 has been described above, but various configurations may be added, which will be described below with reference to FIG. 3.

Figure 3:
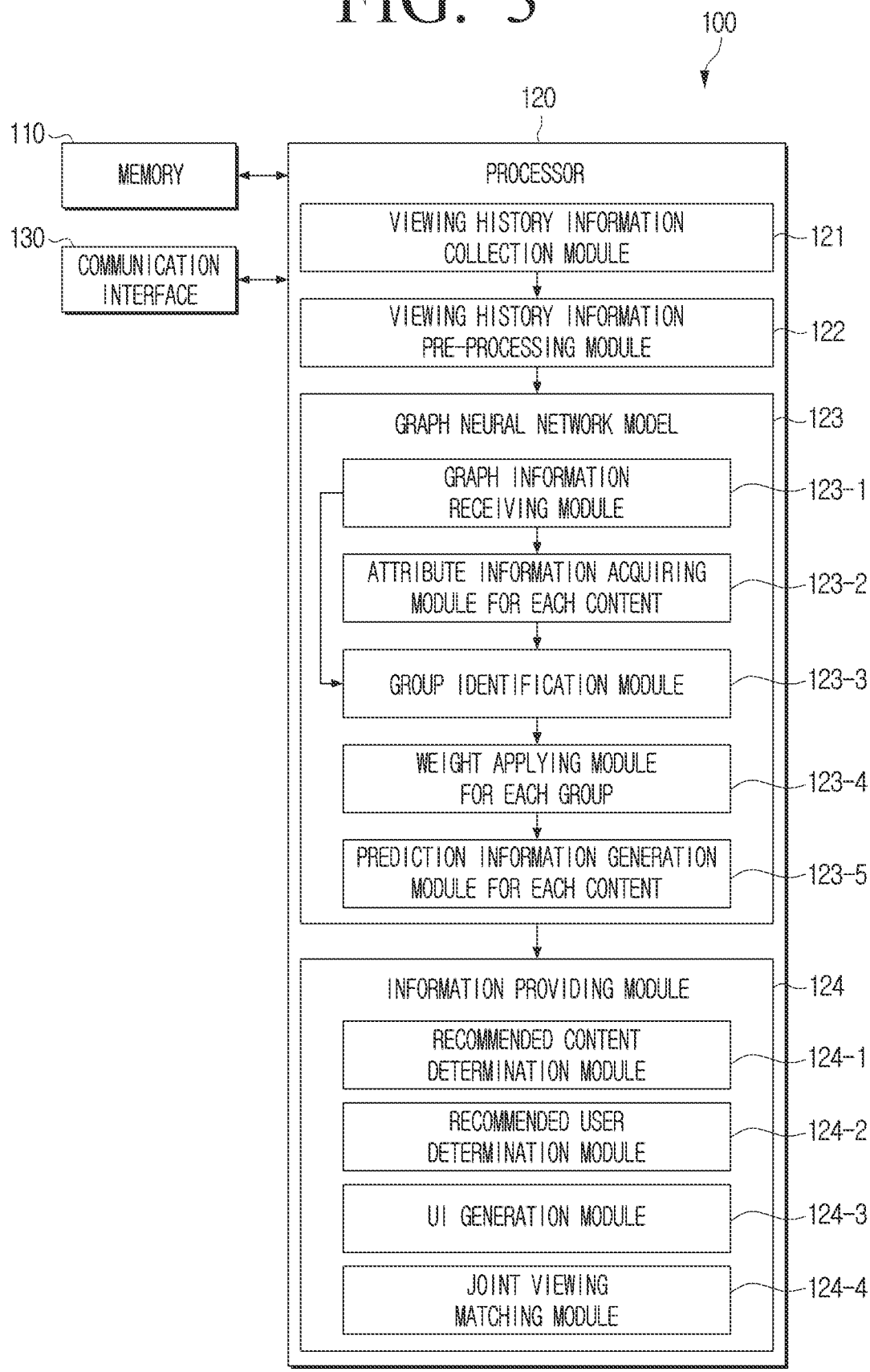
FIG. 3 is a block diagram provided to explain specific configuration of the electronic apparatus of FIG. 2 according to an embodiment of the disclosure.

FIG. 3 is a block diagram provided to explain specific configuration of the electronic apparatus 100 of FIG. 2 according to an embodiment of the disclosure.

With respect to the operations of the memory 110 and the processor 120, redundant descriptions for the same operations as those described above will omitted.

Referring to FIG. 3, the communication interface 130 is configured to perform communication with various types of external devices according to various types of communication methods. The communication interface 130 may include a wireless communication module or a wired communication module. Each communication module may be implemented in the form of at least one hardware chip.

The wireless communication module may be a module that communicates with an external device. For example, the wireless communication module may include at least one of a WiFi module, a Bluetooth module, an infra-red communication module, or other communication modules.

The wired communication module may be a module that communicates with an external device via cable. For example, the wired communication module at least one of a Local Area Network (LAN) module, an Ethernet module, a pair cable, a coaxial cable, an optical fiber cable, or an Ultra Wide-Band module.

The communication interface 130 may receive viewing history information from an external device (e.g., a terminal device). In addition, the communication interface 130 may transmit at least one of a recommended content or recommended user information to the terminal device 200.

The processor 120 may include at least one of a viewing history information collection module 121, a viewing history information pre-processing module 122, a graph neural network model 123, or an information providing module 124.

The viewing history information collection module 121 may be a module that obtains content viewing history information for each of a plurality of users. The electronic apparatus 100 may receive content viewing history information from the plurality of terminal apparatuses 200, 201, 202 through the communication interface 130. The electronic apparatus 100 may store the content viewing history information for each of a plurality of users received through the communication interface 130 in the viewing history information collection module 121.

The viewing history information pre-processing module 122 may be a module that convers the content viewing history information stored in the viewing history information collection module 121 into graph information. The reason for converting the content viewing history information to the graph information is that input data must be converted into a graph form in order to use the graph neural network model 123.

The graph neural network model 123 may include a graph information receiving module 123-1, an attribute information acquiring module for each content 123-2, a group identification module 123-3, a weight applying module for each group 123-4, and a prediction information generation module for each content 123-5.

The graph information receiving module 123-1 may mean a module that receives graph information generated by the viewing history information pre-processing module 122. The graph information may be used as input data of the graph neural network model 123.

The attribute information acquiring module for each content 123-2 may mean a module that acquires attribute information for each content corresponding to a user's content viewing pattern based on input graph information. The attribute information acquiring module for each content 123-2 may acquire attribute information for ach content indicating which viewing pattern a specific user has.

The group identification module 123-3 may mean a module that identifies to which group from among a plurality of predetermined groups a specific user belongs based on the graph information and the attribute information for each content. The group identification module 123-3 may store information regarding a viewing group for each of a plurality of users as group information.

The weight applying module for each group 123-4 may mean a module that applies a weight of each of a plurality of predetermined groups. Each of a plurality of predetermined groups has different weights, and the weight applying module for each group 123-4 may provide a weight for each group to the graph neural network model 123 so that different weights are applied to each group. For example, a weight for each group may be information pre-stored in a learning operation. In another example, a weight for each group may be information updated by a plurality of input data received in real time even after the learning operation.

The prediction information generation module for each content 123-5 may acquire prediction information for each content based on graph information, attribute information for each content, identified group information, and weight information for each group. The prediction information generation module for each content 123-5 may acquire a viewing probability value for each of a plurality of predetermined content regarding a specific user.

The information providing module 124 may include at least one of a recommended content determination module 124-1, a recommended user determination module 124-2, a UI generation module 124-3, or a joint viewing matching module 124-4.

The recommended content determination module 124-1 may mean a module that determines at least one recommended content based on prediction information for each content acquired by the prediction information generation module for each content 123-5. For example, the recommended content determination module 124-1 may determine three content items having the highest probability value from among ten predetermined content items as recommended content.

The recommended user determination module 124-2 may mean a module that determines a recommended user based on group information for each of a plurality of users acquired by the group identification module 123-3. The recommended user determination module 124-2 may determine at least one user included in a group corresponding to a specific user from among a plurality of users as a recommended user in order to provide the specific user with an appropriate recommended user.

The UI generation module 124-3 may mean a module that generates a UI for providing a user with at least one of a recommended content or a recommended user. The UI generation module 124-3 may generate a UI, and the generated UI may be transmitted to the terminal apparatus 200 of a specific user through the communication interface 130.

In addition, the terminal apparatus 200 may provide the specific user with the UI received from the electronic apparatus 100.

The joint viewing matching module 124-4 may mean a module that matches a plurality of users for viewing a specific content together. For example, if there are two users for jointly viewing content A, it is possible to provide a service for viewing content A simultaneously by connecting the two users. The joint viewing matching module 124-4 may perform the function of matching a recommended user determined by the recommend user determination module 124-2 with a specific user. For example, if a user input for joint viewing with a recommended user is input from a specific user, the joint viewing matching module 124-4 may connect the specific user with the recommended user. In addition, the joint viewing matching module 124-4 may perform communication connection so that the specific user and the recommended user performs a voice conversation or a visual conversation.

Figure 4:
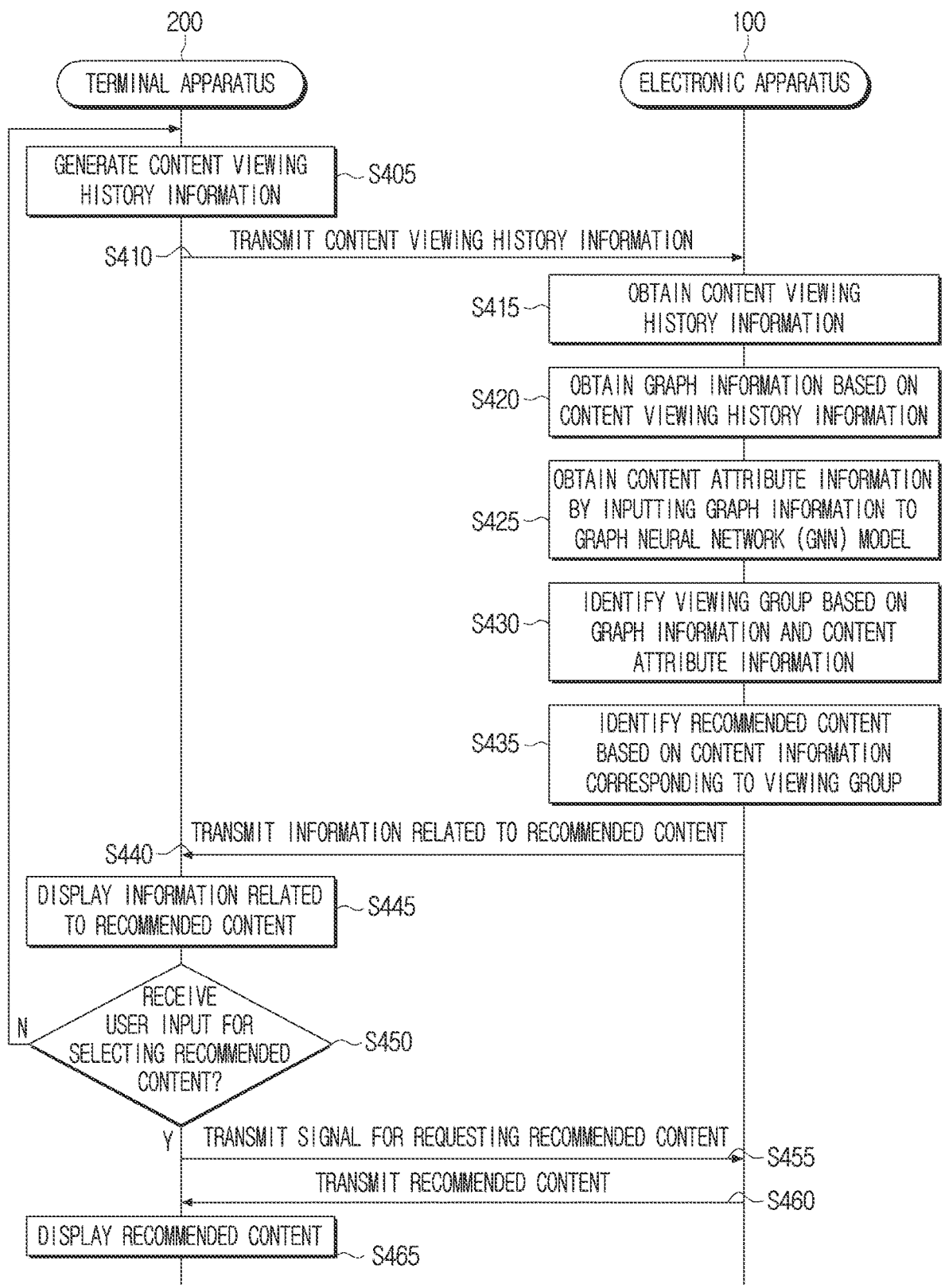
FIG. 4 is a flowchart provided to explain an operation of providing a recommended content based on viewing history information of a terminal apparatus according to an embodiment of the disclosure.

FIG. 4 is a flowchart provided to explain an operation of providing a recommended content based on viewing history information of the terminal apparatus 200 according to an embodiment of the disclosure.

Referring to FIG. 4, the terminal apparatus 200 may generate content viewing history information at operation S405. Subsequently, the terminal apparatus 200 may transmit the content viewing history information to the electronic apparatus 100 at operation S410.

The electronic apparatus 100 may obtain the content viewing history information received from the terminal apparatus 200 at operation S415. The electronic apparatus 100 may obtain graph information based on the content viewing history information at operation S420. The electronic apparatus 100 may input the graph information to the graph neural network model 123 as input data.

The electronic apparatus 100 may obtain attribute information for each content by inputting the graph information to the graph neural network model 123 at operation S425. The attribute information for each content may be information related to a user's viewing pattern. The electronic apparatus 100 may identify a viewing group based on the graph information and the attribute information for each content at operation S430. The electronic apparatus 100 may determine to which viewing group a user using the terminal apparatus 200 belongs. The viewing group may be at least two predetermined groups.

The electronic apparatus 100 may identify a recommended content based on content information corresponding to a viewing group at operation S435. Subsequently, the electronic apparatus 100 may transmit information related to the recommended content to the terminal apparatus 200 at operation S440. The information related to the recommended content may mean detailed information of the recommended content. For example, the information related to the recommended content may include at least one of a name, a reproduction time or a thumbnail image.

The terminal apparatus 200 may receive the information related to the recommended content from the electronic apparatus 100. The terminal apparatus 200 may display the information related to the recommended content received from the electronic apparatus 100 at operation S445. The terminal apparatus 200 may identify whether a user input for selecting a recommended content is received at operation S450. If a user input for selecting a recommended content is not received at operation S450-N, the terminal apparatus 200 may return to operation S405 and continue to generate content viewing history information.

If a user input for selecting a recommended content is received at operation S450-Y, the terminal apparatus 200 may generate a signal for requesting a recommended content and transmit the signal to the electronic apparatus 100 at operation S455.

In response to the signal for requesting a recommended content transmitted from the terminal apparatus 200, the electronic apparatus 100 may transmit a recommended content to the terminal apparatus 200 at operation S460.

The terminal apparatus 200 may display the recommended content received from the electronic apparatus 100 at operation S465. Consequently, the terminal apparatus 200 may automatically provide a content suitable for the user by displaying a recommended content based on the content viewing history information.

FIG. 5 is a view provided to explain graph information according to an embodiment of the disclosure.

Referring to FIG. 5, reference numeral 510 shows that data having a time sequence may have a plurality of nodes (or items). Each of v1, v2, v3, v4, and v5 may mean one node. Reference numeral 510 may indicate order information of v1, v2, v1, v3, v4, and v5.

Reference numeral 520 of FIG. 5 illustrates order information of v1, v2, v1, v3, v4, and v5 in the same manner as reference numeral 510. In contrast to reference numeral 510, reference numeral 520 shows that the same item may be displayed as one node. In reference numeral 520, v1 is implemented as one node, but in reference numeral 510, v1 may be implemented as each node.

In addition, the node 521 may indicate v1, and node 522 may indicate v2. The edge 523 may indicate a connection relationship between the node 521 and the node 522. The edge 523 may indicate that the node 521 is towards the node 522, and indicate the order of the node 521—the node 522.

For example, v1, v2, v1, v3, v4, and v5 may indicate content, and the order information may indicate a viewing order. Reference numerals 510, 520 of FIG. 5 may be graph information indicating that content has been viewed in the order of the first content (v1), the second content (v2), the first content (v1), the third content (v3), the fourth content (v4), and the fifth content (v5).

Figure 6:
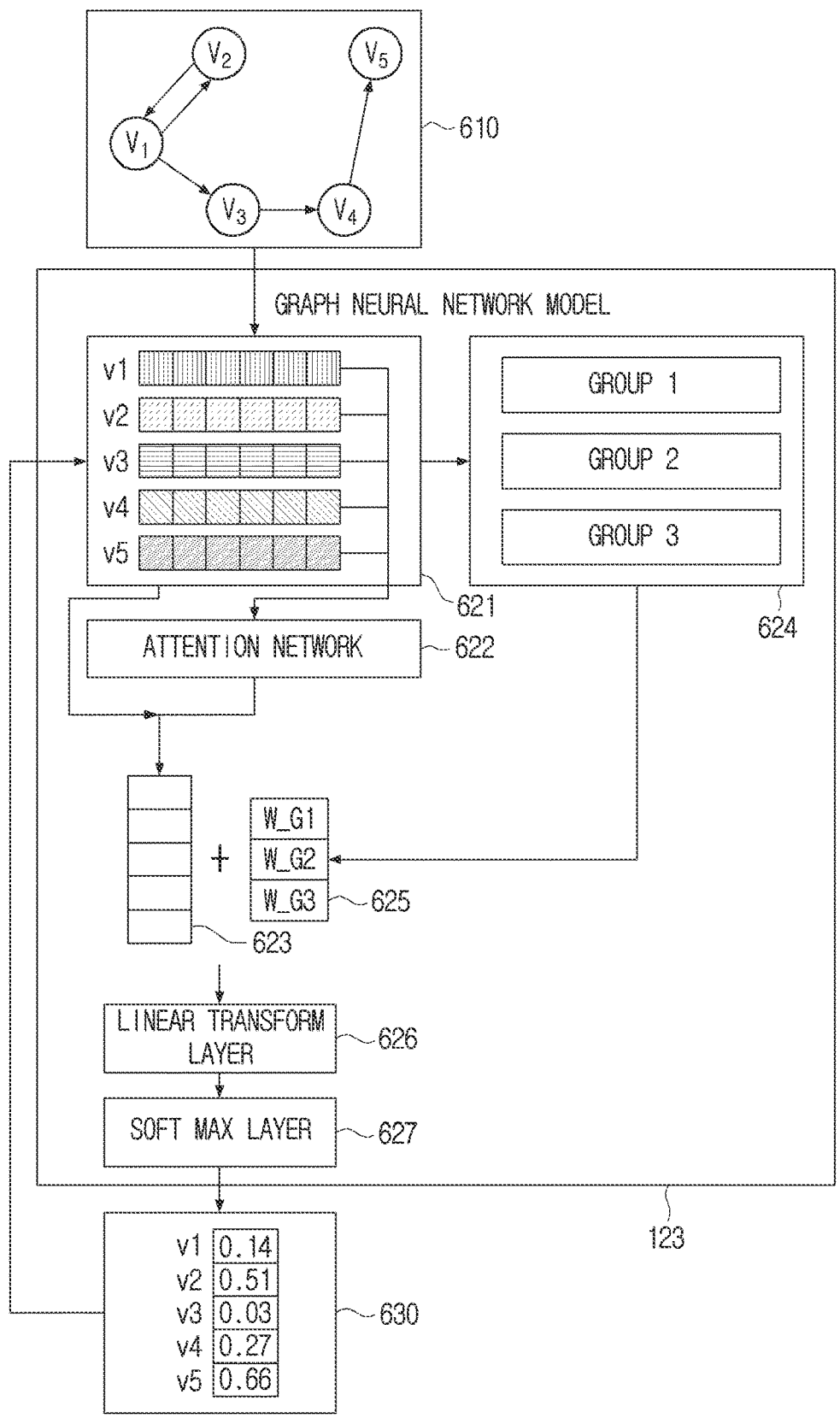
FIG. 6 is a view provided to explain a graph neural network model according to an embodiment of the disclosure.

FIG. 6 is a view provided to explain the graph neural network model 123 according to an embodiment of the disclosure.

Referring to FIG. 6, the graph neural network model 123 may obtain graph information as input data 610. The graph neural network model 123 may obtain item embedding 621 based on the graph information that is input data. The item embedding 621 may mean data in which detailed information of each of a plurality of nodes is defined as a vector. At least one of data of each node included in the item embedding 621 may be transmitted to an attention network 622.

The attention network 622 may obtain session embedding 623 based on at least one of data of each node included in the item embedding 621 or data representing the item embedding 621. The session embedding 623 may mean attribute information for each content. The attention network 622 may perform the operation of applying a weight to a specific item (or node or weight). The attention network 622 may apply different weights to items (or modes) according to a time sequence. For example, the attention network 622 may apply the highest weight to the last viewed item (or node or content).

A group network 624 may identify which viewing group from among a plurality of predetermined viewing groups content the viewing history information of a specific user belongs to based on the item embedding 621. The group network 624 may identify which viewing group each of a plurality of users belongs to by obtaining content viewing history information regarding the plurality of users. In addition, the group network 624 may integrate viewing groups and generate weight information for each viewing group. Here, the group network 624 may include the group identification module 123-3 of FIG. 3.

A linear transform layer 626 may generate combined data by combining the session embedding 623 and the weight information 625.

A soft max layer 627 may generate predefined output data 630 using the combined data that is combined by the linear transform layer 626. The output data 630 may include a probability value regarding each of a plurality of nodes.

For example, the graph neural network model 123 may receive graph information in the order of v1, v2, v1, v3, v4, and v5, and output a predicted probability value of the nodes (v1, v2, v3, v4, v5) which are predicted to be selected after v5. Here, the output data is recited as v1 to v5, but this is only for convenience of explanation. The output data may include a predicted probability value regarding each of a plurality of pre-stored nodes (v1 to vn).

The graph neural network model 123 may generate output data including a predicted probability value that predicts a content to be viewed next based on graph information indicating that content has been viewed in the order of the first content (v1), the second content (v2), the first content (v1), the third content (v3), the fourth content (v4), and the fifth content (v5). The output data may further include a predicted probability value regarding each of a plurality of pre-stored content other than the first content (v1) to the fifth content (v5).

Figure 7:
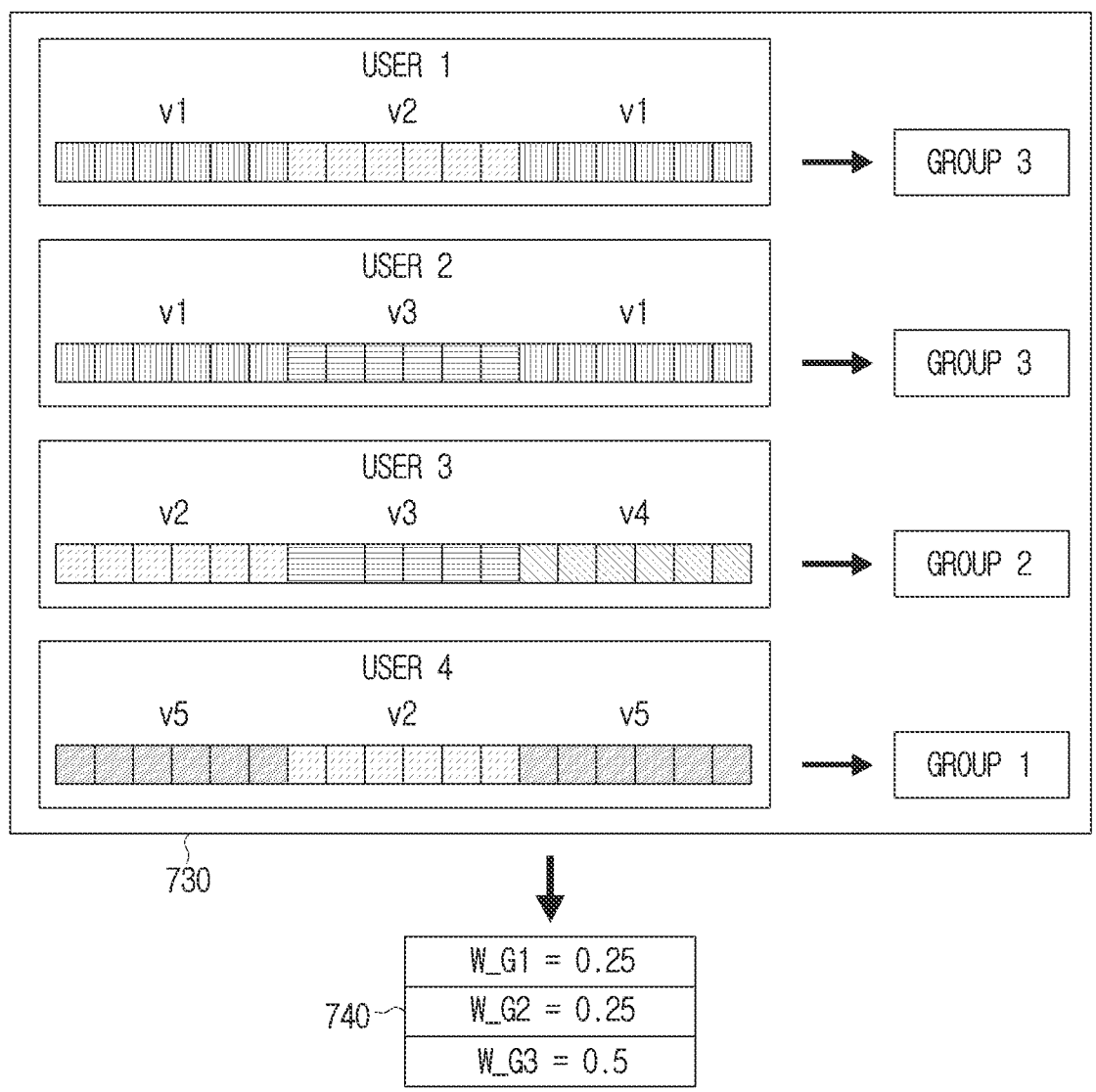
FIG. 7 is a view provided to explain an operation of identifying a viewing group according to an embodiment of the disclosure.

FIG. 7 is a view provided to explain an operation of identifying a viewing group according to an embodiment of the disclosure.

Referring to FIG. 7, the electronic apparatus 100 may determine which viewing group a plurality of users belong to, and obtain weight information for each of a plurality of viewing groups.

The table 710 indicates what kind of data each of the plurality of content (v1 to v5) is. The first content (v1) may be news A, the second content (v2) may be news B, the third content (v3) may be sports A, the fourth content (v4) may be sports B, and the fifth content (v5) may be drama A.

The table 720 indicates a plurality of predetermined viewing groups. The plurality of groups may be defined by a system manager (the manager that controls the electronic apparatus 100). The first group may be defined as a group that mainly views sports in the morning, the second group may be defined as a group that mainly views dramas in the morning, and the third group may be defined as a group that mainly views news in the afternoon.

Operation 730 indicates identifying a viewing group for each of a plurality of users based on content viewing history information for each of the plurality of users. If the content viewing history information indicating that the first user (user 1) views content in the order of the first content (v1), the second content (v2) and the first content (v1) is obtained, the electronic apparatus 100 may identify that the first user corresponds to the third group.

If the content viewing history information indicating that the second user (user 2) views content in the order of the first content (v1), the third content (v3) and the first content (v1) is obtained, the electronic apparatus 100 may identify that the second user corresponds to the third group.

If the content viewing history information indicating that the third user (user 3) views content in the order of the second content (v2), the third content (v3) and the fourth content (v4) is obtained, the electronic apparatus 100 may identify that the third user corresponds to the second group.

If the content viewing history information indicating that the fourth user (user 4) views content in the order of the fifth content (v5), the second content (v2) and the fifth content (v5) is obtained, the electronic apparatus 100 may identify that the fourth user corresponds to the first group.

The electronic apparatus 100 may obtain weight information 740 for each viewing group based on viewing group information corresponding to a plurality of users (the first user to the fourth user). Among the four users, there is one person in the first group, one in the second group, and two in the third group, so the electronic apparatus 100 may determine that the weight of the first group is 0.25, the weight of the second group is 0.25, and the weight of the third group is 0.5. The operation of calculating a weight corresponds to an embodiment, and various methods can be applied. For example, the sum of weights is 1 in the description of FIG. 7, but it may exceed 1 depending on embodiments, which will be exemplified in FIG. 9.

Figure 8:
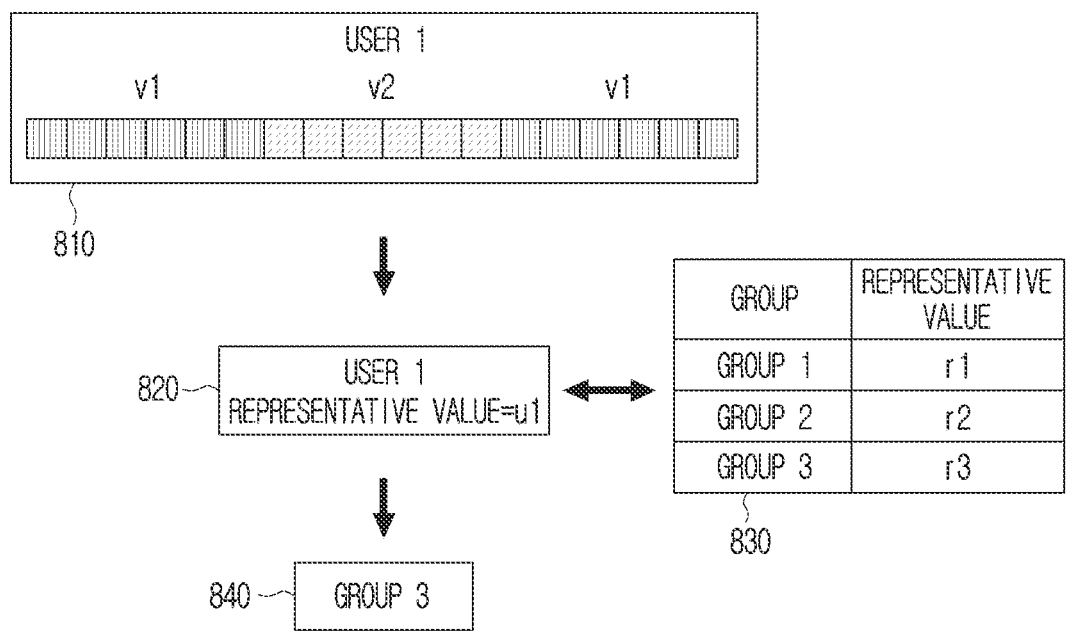
FIG. 8 is a view provided to explain a specific example of a viewing group identification operation according to an embodiment of the disclosure.

FIG. 8 is a view provided to explain a specific example of a viewing group identification operation according to an embodiment of the disclosure.

Referring to FIG. 8, the electronic apparatus 100 may identify a viewing group of a user using a representative value. The electronic apparatus 100 may obtain content viewing history information 810 indicating that the first user (user 1) has viewed content in the order of the first content (v1), the second content (v2) and the first content (v1). In addition, the electronic apparatus 100 may obtain a representative value 820 corresponding to the content viewing history information 810 of the first user.

The electronic apparatus 100 may pre-store representative value information 830 for each viewing group. The electronic apparatus 100 may obtain a similarity by comparing the representative value 820 corresponding to the content viewing history information 810 of the first user and the representative value information 830 for each viewing group. The electronic apparatus 100 may identify which viewing group the first user belongs to based on the obtained similarity. In the embodiment of FIG. 8, the electronic apparatus 100 may identify that the first user belongs to the third group 840.

Figure 9:
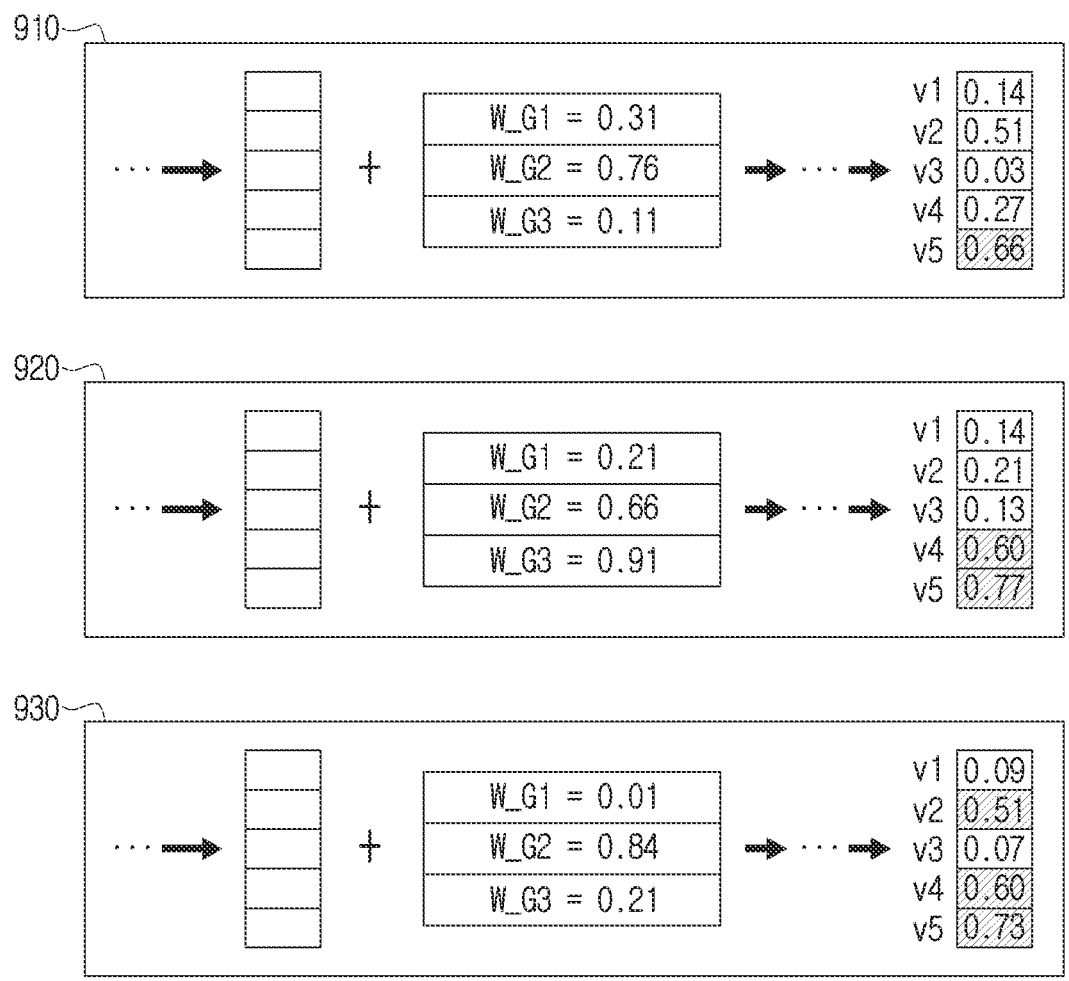
FIG. 9 is a view provided to explain an operation in which output data varies according to a change in a weighted value according to an embodiment of the disclosure.

FIG. 9 is a view provided to explain an operation in which output data varies according to a change in a weighted value according to an embodiment of the disclosure.

Referring to FIG. 9, the electronic apparatus 100 may obtain different output data whenever a weight for each of a plurality of viewing groups is changed.

In reference numeral 910, a weight for the first group may be 0.31, a weight for the second group may be 0.76, and a weight for the third group may be 0.11. The electronic apparatus 100 may obtain prediction information for each content based on the weight for each viewing group. The prediction information for each content may include a probability value (0.14) for viewing the first content, a probability value (0.51) for viewing the second content, a probability value (0.03) for viewing the third content, a probability value (0.27) for viewing the fourth content, and a probability value (0.66) for viewing the fifth content. The electronic apparatus 100 may determine the fifth content (v5) having the highest predicted probability value as a recommended content based on the prediction information for each content.

In reference numeral 920, a weight for the first group may be 0.21, a weight for the second group may be 0.66, and a weight for the third group may be 0.91. The electronic apparatus 100 may obtain prediction information for each content based on a weight for each viewing group. The prediction information for each content may include a probability value (0.14) for viewing the first content, a probability value (0.21) for viewing the second content, a probability value (0.13) for viewing the third content, a probability value (0.60) for viewing the fourth content, and a probability value (0.66) for viewing the fifth content. The electronic apparatus 100 may determine the fourth content (v4) and the fifth content (v5) having the predicted probability values equal to or greater than a threshold value (e.g., 0.6) as a recommended content based on the prediction information for each content.

In reference numeral 930, a weight for the first group may be 0.01, a weight for the second group may be 0.84, and a weight for the third group may be 0.21. The electronic apparatus 100 may obtain prediction information for each content based on a weight for each viewing group. The prediction information for each content may include a probability value (0.09) for viewing the first content, a probability value (0.51) for viewing the second content, a probability value (0.07) for viewing the third content, a probability value (0.60) for viewing the fourth content, and a probability value (0.73) for viewing the fifth content. The electronic apparatus 100 may determine the second content (v2), the fourth content (v4) and the fifth content (v5), the content of the threshold number having the highest probability values, as a recommended content based on the prediction information for each content.

For example, the electronic apparatus 100 may determine a content having the highest predicted probability value from among a plurality of content as a recommended content. An operation thereof is described in the embodiment 910.

In another example, the electronic apparatus 100 may determine a content having a predicted probability value equal to or greater than a threshold value from among a plurality of content as a recommended content. An operation thereof is described in reference numeral 920.

In another example, the electronic apparatus 100 may determine content of an upper threshold number (e.g., three) having the highest predication probability values from among a plurality of content as a recommended content. An operation thereof is described in reference numeral 930.

FIG. 10 is a view provided to explain an embodiment in which a viewing group is defined according to an embodiment of the disclosure.

Referring to FIG. 10, reference numeral 1010 indicates a group that is defined so that a plurality of viewing groups do not overlap. For example, the first group may be a group that views sports in the morning, the second group may be a group that views dramas in the morning, and the third group may be a group that views news in the afternoon.

Reference numeral 1020 of FIG. 10 indicates a group that is defined so that some of viewing groups overlap. For example, the first group may be a group that views sports in the morning, the second group may be a group that views dramas on Mondays, and the third group may be a group that views dramas and news.

Figure 11:
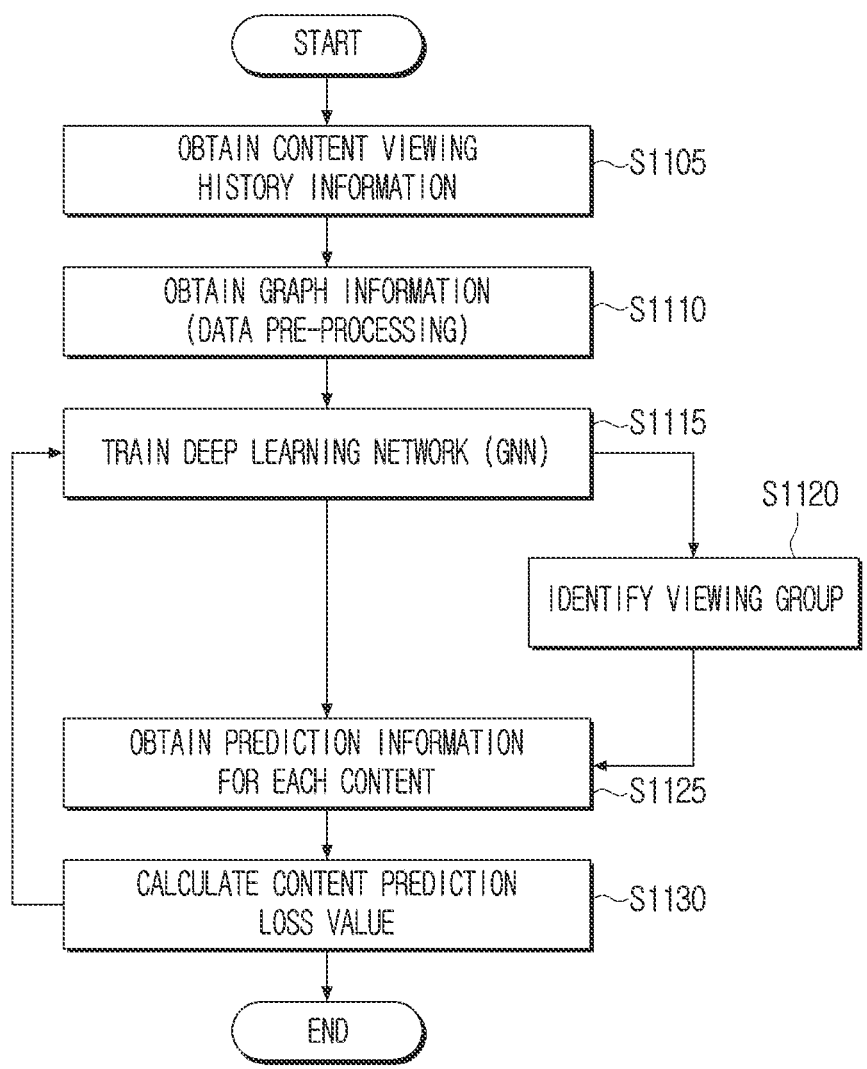
FIG. 11 is a view provided to explain a learning operation of a graph neural network model according to an embodiment of the disclosure.

FIG. 11 is a view provided to explain a learning operation of a graph neural network model according to an embodiment of the disclosure.

Referring to FIG. 11, the electronic apparatus 100 may obtain content viewing history information at operation S1105. The electronic apparatus 100 may obtain graph information based on the content viewing history information at operation S1110. The operation of obtaining graph information may be a data pre-processing operation for obtaining input data of the graph neural network model 123.

The electronic apparatus 100 may perform a deep-learning network learning operation using the graph neural network model 123 at operation S1115. The electronic apparatus 100 may identify a viewing group based on graph information at operation S1120. The electronic apparatus 100 may obtain prediction information for each content based on pre-stored weight information for each viewing group and graph information at operation S1125. The electronic apparatus 100 may calculate a predicted loss value by comparing prediction information for each content and actual learning data at operation S1130. The electronic apparatus 100 may change at least one parameter used for a deep-learning network learning operation based on the loss value. The electronic apparatus 100 may complete a certain learning operation and finally determine a parameter used for the graph neural network model 123.

FIG. 12 is a view provided to explain prediction information for each content for each of a plurality of users according to an embodiment of the disclosure.

Referring to FIG. 12, a table 1210 indicates prediction information for each content that is predicted by a plurality of users over time. In the first time (t1), the predicted probability value that the first user (user 1) would view the first content (v1) may be 0.1, the predicted probability value to view the second content (v2) may be 0.2, the probability value to view the third content (v3) may be 0.1, the probability value to view the fourth content (v4) may be 0.2, and the probability value to view the fifth content (v5) may be 0.5.

The description regarding the second time (t2) and the third time (t3) for the first user and description regarding the second user and the third user will be omitted.

Referring to the table 1210, the electronic apparatus 100 may identify that the first user and the third user both viewed the fifth content (v5) from the first time (t1) to the third time (t3). The electronic apparatus 100 may identify the first user and the third user as the same viewing group.

Figure 13:
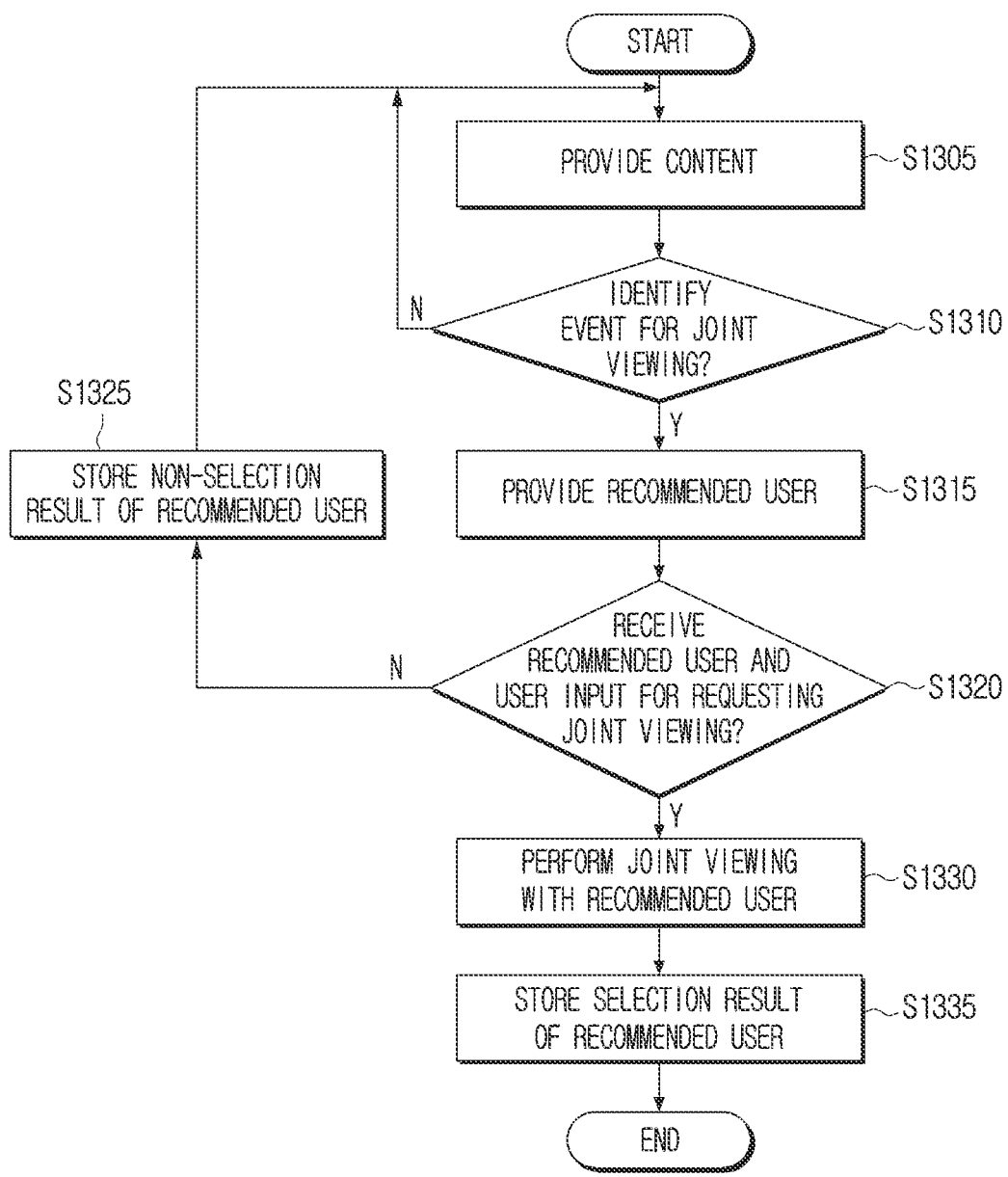
FIG. 13 is a flowchart provided to explain an operation of providing a recommended user and an operation of selecting a recommended user according to an embodiment of the disclosure.

FIG. 13 is a flowchart provided to explain an operation of providing a recommended user and an operation of selecting a recommended user according to an embodiment of the disclosure.

Referring to FIG. 13, the electronic apparatus 100 may provide a user with a content at operation S1305. If the electronic apparatus 100 is a server and the terminal apparatus 200 includes a display, the electronic apparatus 100 may transmit a content to the terminal apparatus 200 and the terminal apparatus 200 may display the content received from the electronic apparatus 100 on a display.

The electronic apparatus 100 may determine whether an event for joint viewing is identified at operation S1310. The event for joint viewing may include at least one of an event in which a recommended content is provided, an event in which a user command for joint viewing is received, an event in which a content that is currently viewed is terminated, or an event in which a user input for viewing a new content is received.

If the event for joint viewing is not identified at operation S1310-N, the electronic apparatus 100 may return to operation S1305 of providing the content. If the event for joint viewing is identified at operation S1310-Y, the electronic apparatus 100 may provide a recommended user at operation S1315. The electronic apparatus 100 may identify whether a user input for requesting joint viewing with the recommended user is received at operation S1320.

If the user input for requesting joint viewing with the recommended user is not received at operation S1320-N, the electronic apparatus 100 may store the result of not selecting the recommended user at operation S1325, and return to operation S1305. The result of not selecting the recommended user may include that although the electronic apparatus 100 provides a recommended user, the user does not select the recommended user. The electronic apparatus 100 may store such a result and train the graph neural network model 123 to lower the probability of recommending the same recommended user.

If the user input for requesting joint viewing with the recommended user is received at operation S1320-Y, the electronic apparatus 100 may provide the function of joint viewing with the recommended user at operation S1330. The electronic apparatus 100 may store the result of selecting the recommended user at operation S1335. The result of selecting the recommended user may include that after the electronic apparatus 100 provides a recommended user, the user selects the recommended user. The electronic apparatus 100 may store such a result and train the graph neural network model 123 to increase the probability of recommending the same recommended user.

Figure 14:
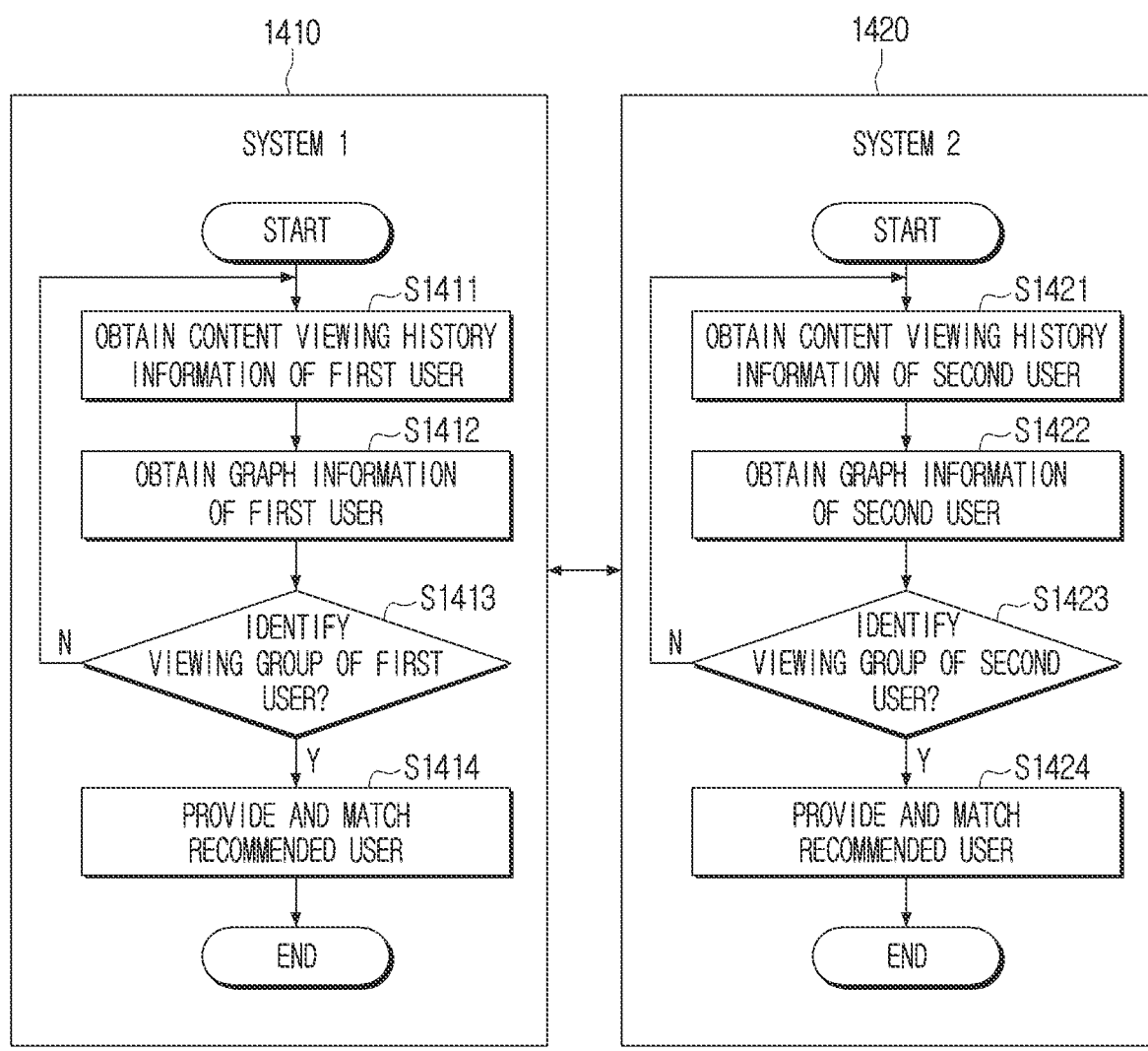
FIG. 14 is a flowchart provided to explain an operation of matching different users for joint viewing according to an embodiment of the disclosure.

FIG. 14 is a flowchart provided to explain an operation of matching different users for joint viewing according to an embodiment of the disclosure.

Referring to FIG. 14, the electronic apparatus 100 may include a first system 1410 and a second system 1420. The first system 1410 may be a system that processes information of the first user, and the second system 1420 may be a system that processes information of the second user. In other words, the electronic apparatus 100 may process information using a separate system for each user.

The first system 1410 may obtain content viewing history information of the first user at operation S1411. The first system 1410 may obtain graph information of the first user at operation S1412. The first system 1410 may identify a viewing group of the first user at operation S1413. If the viewing group of the first user is not identified at operation S1413-N, the electronic apparatus 100 may return to operation S1411. If the viewing group of the first user is identified at operation S1413-Y, the electronic apparatus 100 may provide a recommended user and perform the operation of matching with another user at operation S1414.

The second system 1420 may obtain content viewing history information of the second user at operation S1421. The second system 1420 may obtain graph information of the second user at operation S1422. The second system 1420 may identify a viewing group of the second user at operation S1423. If the viewing group of the second user is not identified at operation S1423-N, the electronic apparatus 100 may return to operation S1421. If the viewing group of the second user is identified at operation S1423-Y, the electronic apparatus 100 may provide a recommended user and perform the operation of matching with another user at operation S1424.

Referring to FIG. 14, it is assumed that the first user and the second user belong to the same group. The electronic apparatus 100 may recommend the second user to the first user and recommend the first user to the second user. The electronic apparatus 100 may provide the joint viewing function for the first user and the second user based on the selection of the first user and the selection of the second user.

Figure 15:
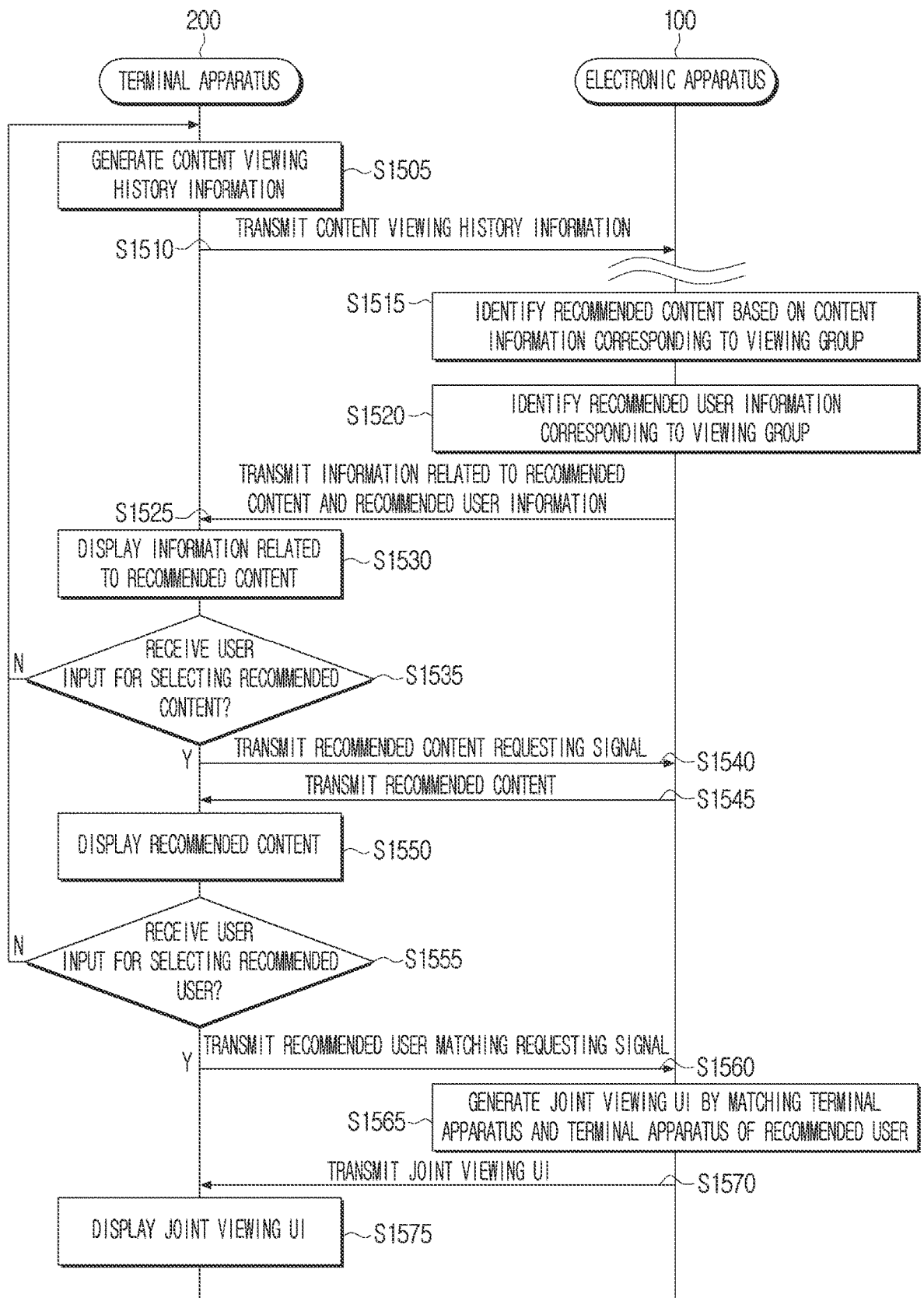
FIG. 15 is a flowchart provided to explain an operation of providing a recommended content and recommended user information based on viewing history information of a terminal apparatus according to an embodiment of the disclosure.

FIG. 15 is a flowchart provided to explain an operation of providing a recommended content and recommended user information based on viewing history information of the terminal apparatus 200 according to an embodiment of the disclosure.

Referring to FIG. 15, the terminal apparatus 200 may generate content viewing history information at operation S1505. The terminal apparatus 200 may transmit the content viewing history information to the electronic apparatus 100 at operation S1510.

The electronic apparatus 100 may identify a recommended content based on the content viewing history information received from the terminal apparatus 200. The related operations have been described in the operations of S415 and S435 and thus, a redundant description will be omitted.

The electronic apparatus 100 may identify a recommended content based on content information corresponding to a viewing group at operation S1515. The electronic apparatus 100 may identify recommended user information corresponding to a viewing group at operation S1520. The recommended user information may mean user information for jointly viewing a recommend content. The electronic apparatus 100 may transmit both information regarding the recommended content and the recommended user information to the terminal apparatus 200 at operation S1525.

The terminal apparatus 200 may receive both the information regarding the recommended content and the recommended user information from the electronic apparatus 100. The terminal apparatus 200 may preferentially display the information regarding the recommended content at operation S1530. Subsequently, the terminal apparatus 200 may identify whether a user input for selecting the recommended content is received at operation S1535. If a user input for selecting the recommended content is not received at operation S1535-N, the terminal apparatus 200 may return to operation S1505.

If a user input for selecting the recommended content is received at operation S1535-Y, the terminal apparatus 200 may generate a signal for requesting the recommended content and transmit the signal to the electronic apparatus 100 at operation S1540.

The electronic apparatus 100 may transmit the recommended content to the terminal apparatus 200 in response to the signal for requesting the recommended content, received from the electronic apparatus 100 at operation S1545.

The terminal apparatus 200 may display the recommended content received from the electronic apparatus 100 at operation S1550. The terminal apparatus 200 may identify whether a user input for selecting a recommended user is received at operation S1555. If a user input for selecting a recommended user is not received at operation S1555-N, the terminal apparatus 200 may return to operation S1505 while displaying only the recommended content.

If a user input for selecting a recommended user is received at operation S1555-Y, the terminal apparatus 200 may generate a signal for requesting recommended user matching and transmit the signal to the electronic apparatus 100 at operation S1560.

The electronic apparatus 100 may generate a joint viewing UI in response to the signal for requesting recommend user matching, received from the terminal apparatus 200. The electronic apparatus 100 may generate a joint viewing UI by matching the terminal apparatus 200 with the terminal apparatus of the selected recommended user at operation S1565. Subsequently, the electronic apparatus 100 may transmit the joint viewing UI to the terminal apparatus 200 at operation S1570.

The terminal apparatus 200 may display the joint viewing UI received from the electronic apparatus 100 at operation S1575. The user of the terminal apparatus 200 may be provided with a joint viewing service by selecting the recommended content and the recommended user.

Figure 16:
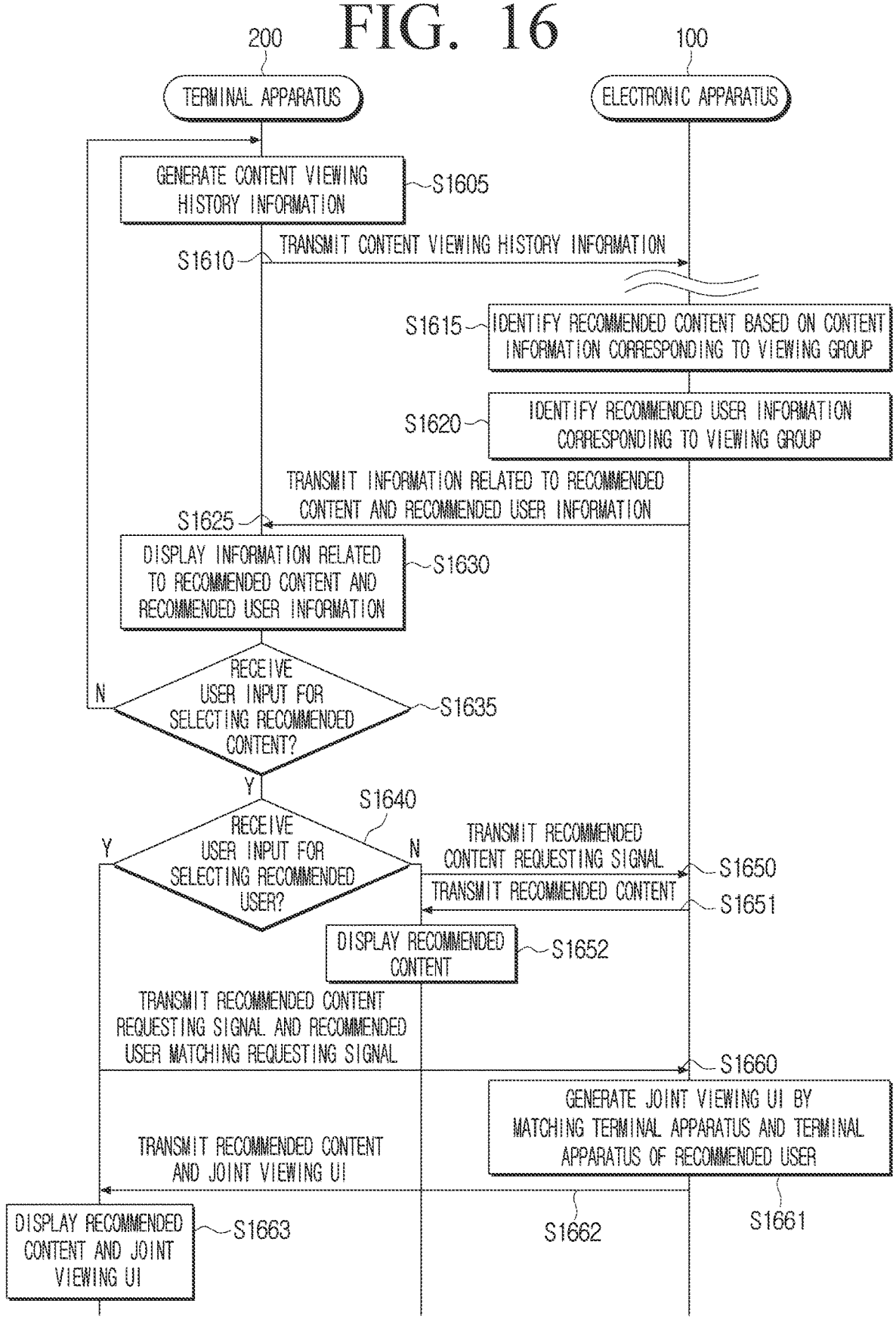
FIG. 16 is a flowchart provided to explain an operation of providing a recommended content and recommended user information based on viewing history information of a terminal apparatus according to an embodiment of the disclosure.

FIG. 16 is a flowchart provided to explain an operation of providing a recommended content and recommended user information based on viewing history information of the terminal apparatus 200 according to an embodiment of the disclosure.

Referring to FIG. 16, the terminal apparatus 200 may generate content viewing history information at operations S1605. The terminal apparatus 200 may transmit the content viewing history information to the electronic apparatus 100 at operations S1610.

The electronic apparatus 100 may identify a recommended content based on the content viewing history information received from the terminal apparatus 200 at operation S1615. The related operations have been described in the operations of S415 to S435 and thus, a redundant description will be omitted.

The electronic apparatus 100 may identify recommended user information corresponding to a viewing group at operation S1620. The electronic apparatus 100 may transmit information related to the recommended content and the recommended user information to the terminal apparatus 200 at operation S1625.

The terminal apparatus 200 may display the information related to the recommended content and the recommended user information received from the electronic apparatus 100 at operation S1630. The terminal apparatus 200 may identify whether a user input for selecting the recommended content is received at operation S1635. If a user input for selecting the recommended content is not received at operation S1635-N, the terminal apparatus 200 may return to operation S1605.

If a user input for selecting the recommended content is received at operation S1635-Y, the terminal apparatus 200 may identify whether a user input for selecting a recommended user is received at operation S1640.

If a user input for selecting a recommended user is not received at operation S1640-N, the terminal apparatus 200 may transmit a recommended content request signal to the electronic apparatus 100 at operation S1650. The electronic apparatus 100 may transmit a recommended content to the terminal apparatus 200 in response to the recommended content request signal transmitted from the electronic apparatus 100 at operation S1651. The terminal apparatus 200 may display the recommended content received from the electronic apparatus 100 at operation S1652.

If a user input for selecting a recommended user is received at operation S1640-Y, the terminal apparatus 200 may transmit a recommended content request signal and a recommend user matching request signal to the electronic apparatus 100 at operation S1660. In response to the signals requested by the terminal apparatus 200, the electronic apparatus 100 may generate a joint viewing UI by matching the terminal apparatus 200 and the terminal apparatus of the recommended user at operation S1661. Subsequently, the electronic apparatus 100 may transmit the recommended content and the joint viewing UI to the terminal apparatus 200 at operation S1662. The terminal apparatus 200 may display the recommended content and the joint viewing UI received from the electronic apparatus 100 at operation S1663.

Figure 17:
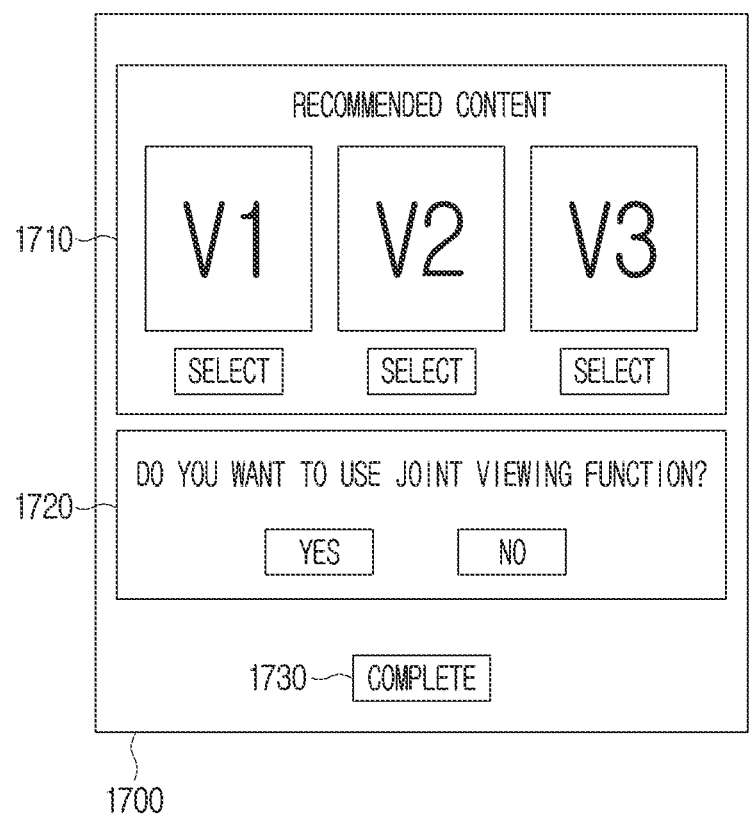
FIG. 17 is a view provided to explain a UI for guiding a recommended content and a joint viewing function according to an embodiment of the disclosure.

FIG. 17 is a view provided to explain a UI for guiding a recommended content and a joint viewing function according to an embodiment of the disclosure.

Referring to FIG. 17, the electronic apparatus 100 may generate a UI 1700 for guiding a recommended content and a joint viewing function.

The UI 1700 may include at least one of a UI 1710 for guiding to select at least one recommended content, a UI 1720 for inquiring whether to use a joint viewing function or a UI 1730 for confirming a user's final selection.

The electronic apparatus 100 may generate the UI 1700 and transmit the UI 1700 to the terminal apparatus 200, and the terminal apparatus 200 may display the received UI 1700. If a user input is received through the UI 1700, the terminal apparatus 200 may transmit information corresponding to the user input to the electronic apparatus 100.

Figure 18:
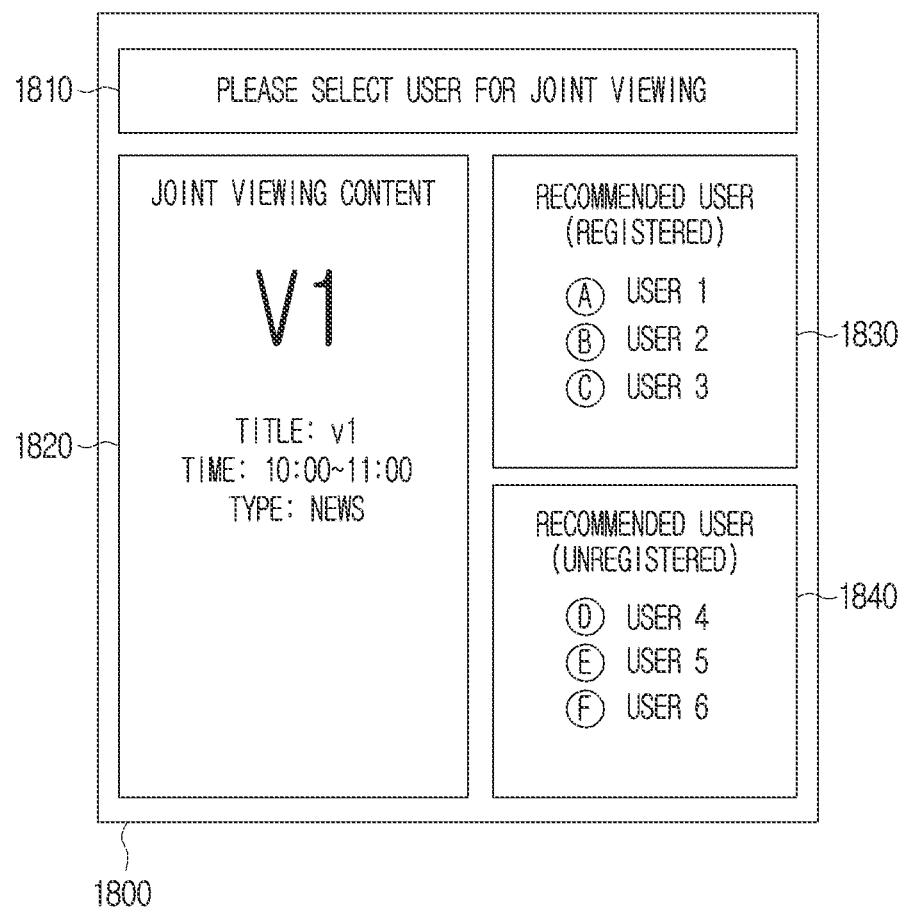
FIG. 18 is a view provided to explain a UI for providing a recommended user and guiding selection of a recommended user according to an embodiment of the disclosure.

FIG. 18 is a view provided to explain a UI for providing a recommended user and guiding selection of a recommended user according to an embodiment of the disclosure.

Referring to FIG. 18, the electronic apparatus 100 may generate a UI 1800 for guiding selection of a recommended user for joint viewing.

The UI 1800 may include at least one of text information 1810 for selecting a user for joint viewing, a UI 1820 including information related to a joint viewing content, a UI 1830 including a recommended user form among a plurality of registered users, or a UI 1840 including a recommended user from among a plurality of unregistered users.

The electronic apparatus 100 may generate the UI 1800 and transmit the UI 1800 to the terminal apparatus 200 may display the received UI 1800. If a user input is received through the UI 1800, the terminal apparatus 200 may transmit information corresponding to the user input to the electronic apparatus 100.

Figure 19:
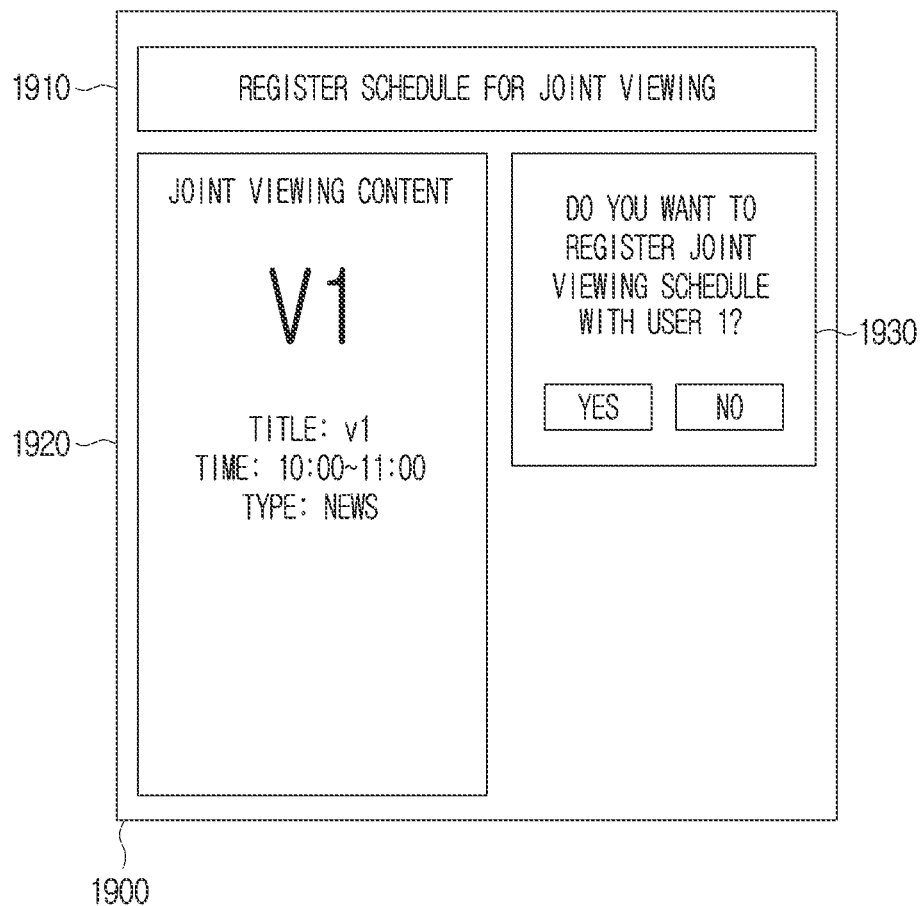
FIG. 19 is a view provided to explain a UI for guiding registration of a joint viewing schedule according to an embodiment of the disclosure.

FIG. 19 is a view provided to explain a UI for guiding registration of a joint viewing schedule according to an embodiment of the disclosure.

Referring to FIG. 19, the electronic apparatus 100 may generate a UI 1900 for guiding registration of a joint viewing schedule.

The UI 1900 may include at least one of text information 1910 for guiding to select registration of a joint viewing schedule, a UI 1920 including information related to a joint viewing content or a UI 1930 inquiring whether to select registration of a joint viewing schedule.

The electronic apparatus 100 may generate the UI 1900 and transmit the UI 1900 to the terminal apparatus 200, and the terminal apparatus 200 may display the received UI 1900. If a user input is received through the UI 1900, the terminal apparatus 200 may transmit information corresponding to the user input to the electronic apparatus 100.

Figure 20:
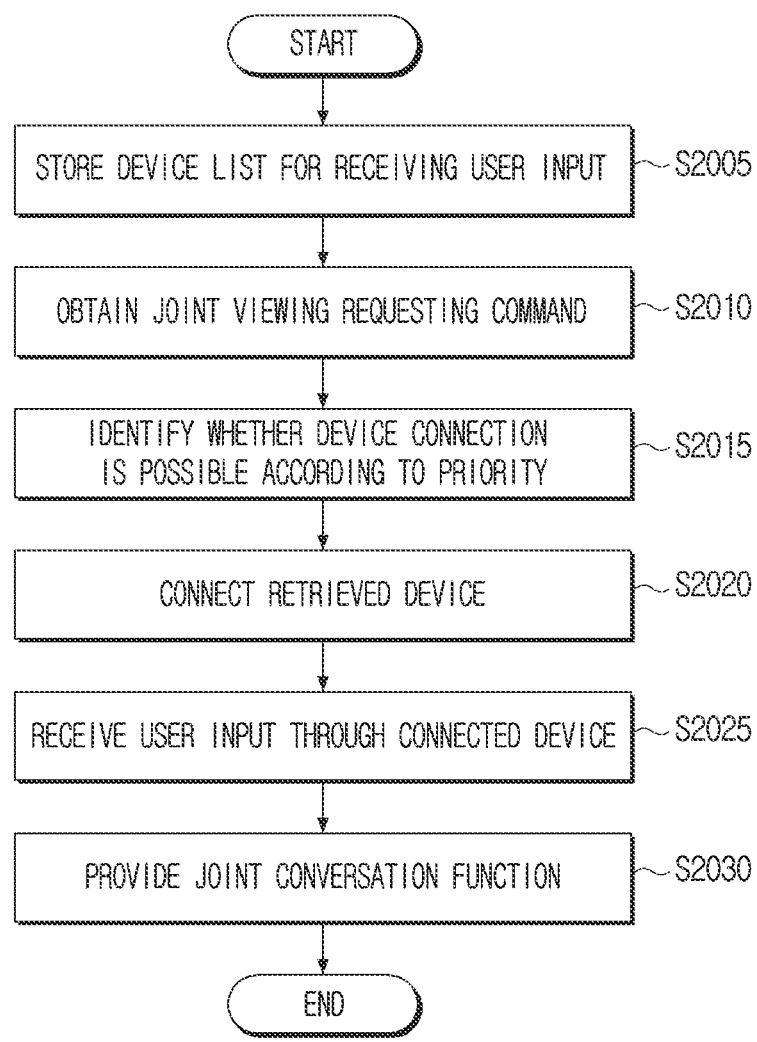
FIG. 20 is a flowchart provided to explain an operation of connecting a terminal apparatus and a device for using a conversation function in a joint viewing function according to an embodiment of the disclosure.

FIG. 20 is a flowchart provided to explain an operation of connecting the terminal apparatus 200 and a device for using a conversation function in a joint viewing function according to an embodiment of the disclosure.

Referring to FIG. 20, the terminal apparatus 200 may store a device list for receiving a user input at operation S2005. The terminal apparatus 200 may obtain a command for requesting joint viewing at operation S2010. The terminal apparatus 200 may search whether device connection is possible according to priority at operation S2015. For example, the terminal apparatus 200 may attempt to connect to each device according to a predetermined priority in a pre-stored device list.

The terminal apparatus 200 may perform a communicative connection with one found device at operation S2020. The terminal apparatus 200 may receive a user input through the device which is communicatively connected at operation S2025. The terminal apparatus 200 may provide a user with a joint conversation function by providing the received user input to the electronic apparatus 100 at operation S2030.

Figure 21:
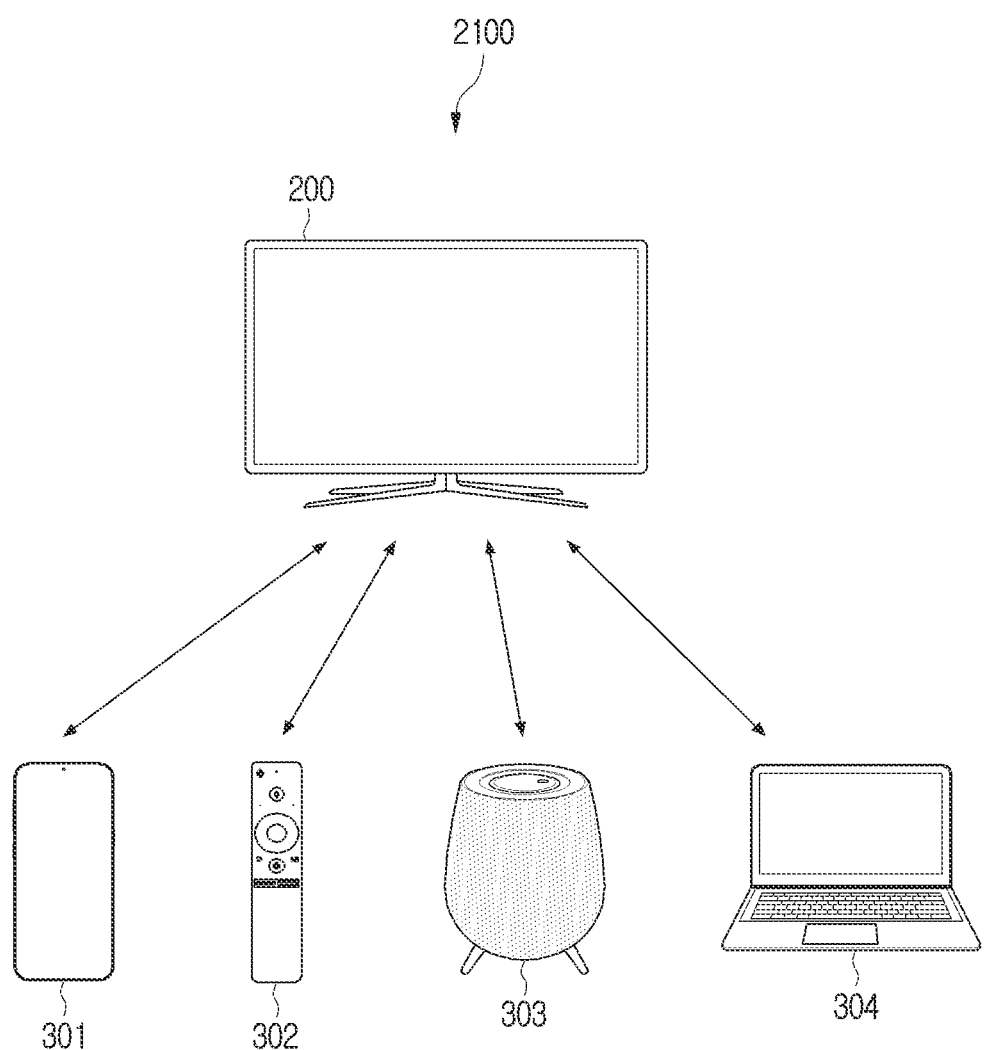
FIG. 21 is a system view provided to explain at least one device connected to a terminal apparatus according to an embodiment of the disclosure.

FIG. 21 is a system view provided to explain at least one device 301, 302, 303, 304 connected to the terminal apparatus 200 according to an embodiment of the disclosure.

Referring to FIG. 21, a system 2100 includes the terminal apparatus 200 and the plurality of devices 301, 302, 303, 304 that receive a user input. The plurality of devices 301, 302, 303, 304 may be a device that receives a user input. The first device 301 may be a mobile phone, the second device 302 may be a remote controller, the third device 303 may be an AI speaker, and the fourth device 304 may be a notebook PC, although embodiments of the disclosure are not limited thereto. A user may input a voice and a text through the plurality of devices 301, 302, 303, and 304, and the terminal apparatus 200 may receive a user input through the plurality of devices 301, 302, 303, and 304. The terminal apparatus 200 may transmit the received user input to the electronic apparatus 100.

Figure 22:
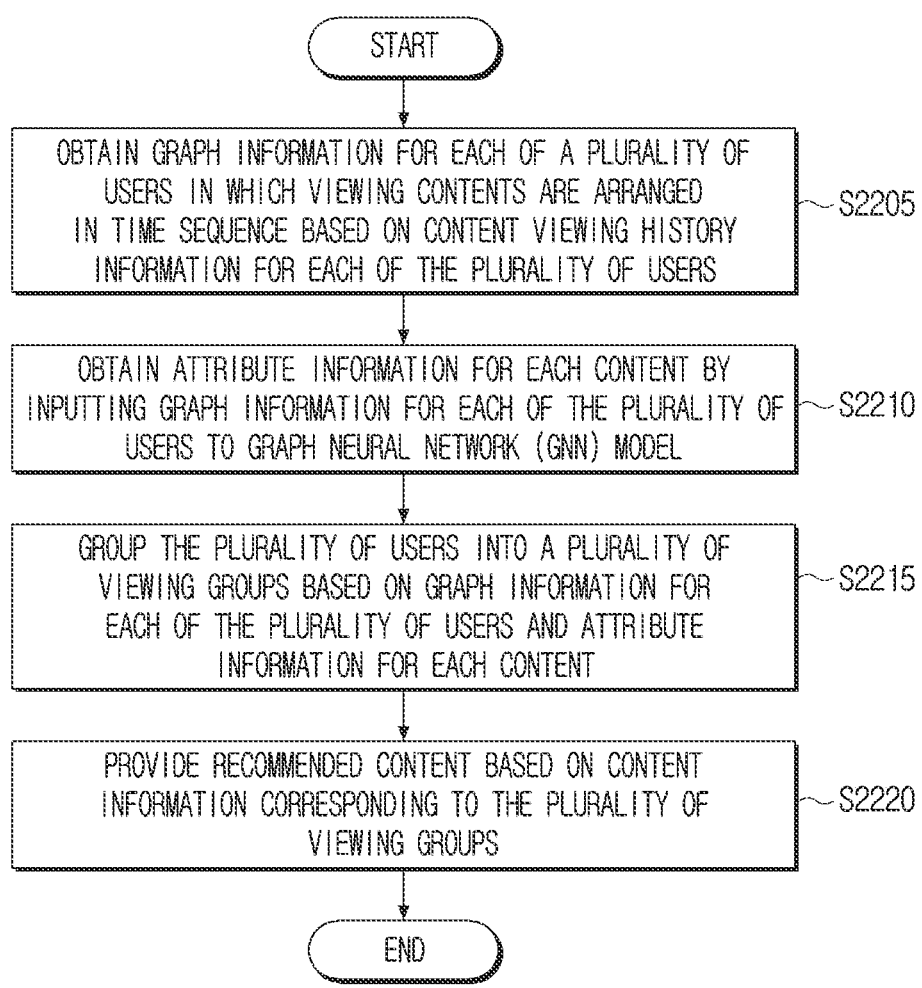
FIG. 22 is a view provided to explain a controlling method of an electronic apparatus according to an embodiment of the disclosure.

FIG. 22 is a view provided to explain a controlling method of the electronic apparatus 100 according to an embodiment of the disclosure.

Referring to FIG. 22, the controlling method of the electronic apparatus 100 includes obtaining graph information for each of a plurality of users in which viewing content is arranged in a time sequence based on content viewing history information of each of a plurality of users at operation S2205, obtaining attribute information for each content by inputting the graph information for each of the plurality of users to a graph neural network (GNN) model at operation S2210, grouping the plurality of users into a plurality of viewing groups based on the graph information for each of the plurality of users and the attribute information for each content at operation S2215, and providing a recommend content based on content information corresponding to the plurality of viewing groups at operation S2220.

The operation of providing recommended content at operation S2220 may include obtaining prediction information for each content for each of a plurality of users based on the graph information for each of the plurality of users and weight information corresponding to each of the plurality of viewing groups, obtaining content information corresponding to the plurality of viewing groups based on the prediction information for each content for each of the plurality of users, and providing a recommended content based on the obtained content information.

The attribute information for each content may include information related to a viewing pattern.

The controlling method may further include providing a UI including text corresponding to attribute information for each content related to a viewing pattern and information related to a recommended content.

The operation of grouping at operation S2215 may include obtaining a representative value for each of a plurality of users corresponding to graph information for each of the plurality of users, and grouping the plurality of users into a plurality of viewing groups by comparing a plurality of representative values corresponding to the plurality of viewing groups with a representative value for each of the plurality of users.

The controlling method may further include, if a predetermined event is received from the terminal apparatus 200, providing recommended user information corresponding to a plurality of viewing groups for a joint viewing function.

The providing recommended user information may include, if a predetermined event is received from the terminal apparatus 200, identifying a viewing group corresponding to the terminal apparatus 200 and providing at least one user information corresponding to the identified viewing group as recommended user information.

The controlling method may further include, if a predetermined event is received from the terminal apparatus 200, generating a UI including a recommended content and recommended user information and transmitting the generated UI to the terminal apparatus 200.

The predetermined event may include at least one of an event where a recommended content is provided, an event where a user command for joint viewing is received, an event where a currently-viewed content is terminated, or an event where a user input for viewing a new content is received.

The graph neural network model 123 may be a model that is trained using at least one viewing content viewed by a plurality of users as input learning data and using a viewing content viewed by the plurality of users after watching the at least one viewing content as output learning data.

The controlling method of the electronic apparatus 100 as in FIG. 22 may be executed in the electronic apparatus 100 having the configuration of FIG. 2 or 3, and may also be executed in an electronic apparatus having other configurations.

The methods according to the various embodiments of the disclosure described above may be implemented in the form of an application that may be installed in an existing electronic apparatus.

The methods according to the various embodiments of the disclosure described above may be implemented by software upgrade or hardware upgrade for the existing electronic apparatus.

The various embodiments of the disclosure described above may also be performed through an embedded server included in the electronic apparatus or an external server of at least one of the electronic apparatus or the display apparatus.

The various embodiments described above may be implemented as software including instructions stored in a storage medium (e.g., a machine-readable storage medium) readable by a machine (e.g., a computer). A machine may be an apparatus that invokes the stored instruction from the storage medium and may operate according to the invoked instruction, and may include the electronic apparatus according to the disclosed embodiments. When a command is executed by the processor, the processor may directly perform a function corresponding to the command or other components may perform the function corresponding to the command under a control of the processor. The command may include codes created or executed by a compiler or an interpreter. The machine-readable storage medium may be provided in the form of a non-transitory storage medium. Here, the term 'non-transitory' means that the storage medium is tangible without including a signal, and does not distinguish whether data are semi-permanently or temporarily stored in the storage medium.

In addition, according to an embodiment of the disclosure, the methods described above may be included and provided in a computer program product. The computer program product may be traded as a product between a seller and a purchaser. The computer program product may be distributed in the form of a storage medium (e.g., a compact disc read only memory (CD-ROM)) that may be read by the machine or online through an application store (e.g., Play- Store™). In a case of the online distribution, at least portions of the computer program product may be at least temporarily stored in a storage medium such as a memory of a server of a manufacturer, a server of an application store, or a relay server or be temporarily created.

In addition, each component (e.g., modules or programs) according to the various embodiments described above may include a single entity or a plurality of entities, and some of the corresponding sub-components described above may be omitted or other sub-components may be further included in the diverse embodiments. Alternatively or additionally, some of the components (e.g., the modules or the programs) may be integrated into one entity, and may perform functions performed by the respective corresponding components before being integrated in the same or similar manner. Operations performed by the modules, the programs, or other components according to the diverse embodiments may be executed in a sequential manner, a parallel manner, an iterative manner, or a heuristic manner, at least some of the operations may be performed in a different order or be omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
a communication interface;
memory; and
a processor connected to the memory,
wherein the memory stores one or more computer programs including computer-executable instructions that, when executed by the one or more processors, cause the electronic apparatus to:
 obtain graph information for a plurality of users in which viewing content is arranged in a time sequence based on content viewing history information for a plurality of users,
 obtain attribute information for each content by inputting the graph information for the plurality of users to a Graph Neural Network (GNN) model,
 group the plurality of users into a plurality of viewing groups based on the graph information for the plurality of users and the attribute information for each content, and
 provide a recommended content based on content information corresponding to the plurality of viewing groups,
wherein the attribute information for each content comprises information regarding a viewing pattern for each of the plurality of users according to when the content was viewed,
wherein the graph information corresponds to a directed graph including nodes corresponding to the viewing content and edges corresponding to the time sequence,
wherein the GNN model is a neural network model trained using data in a form of a graph,
wherein the one or more computer programs further comprise computer-readable instructions to:
 obtain a representative value for a plurality of users corresponding to graph information for the plurality of users,
 group the plurality of users into a plurality of viewing groups by comparing a plurality of representative values corresponding to the plurality of viewing groups with a representative value for each of the plurality of users,
 based on a predetermined event being received from a terminal apparatus through the communication interface, identify a viewing group corresponding to the terminal apparatus among the plurality of viewing groups; and
 provide recommended user information corresponding to users in the identified viewing group to the terminal apparatus for a joint viewing function to watch content together with the users in the identified viewing group,
wherein, to provide the recommended content, the one or more computer programs further comprise computer-readable instructions to:
 obtain prediction information for each content for each of the plurality of users based on graph information for the plurality of users and weighted value information for each of the plurality of viewing groups,
 obtain content information corresponding to the plurality of viewing groups based on the prediction information for content for each of the plurality of users, and
 provide the recommended content based on the obtained content information,
wherein the recommended user information includes information for selecting a counterpart to use the joint viewing function together, and
wherein the joint viewing function is a feature that allows the users to watch content simultaneously.

2. The apparatus as claimed in claim 1, wherein the attribute information for each content includes information regarding a viewing pattern.

3. The apparatus as claimed in claim 2, wherein the one or more computer programs further comprise computer-readable instructions to provide a User Interface (UI) including a text corresponding to the attribute information for each content related to a viewing pattern and information related to the recommended content.

4. The apparatus as claimed in claim 1, wherein the one or more computer programs further comprise computer-readable instructions to:
 obtain a representative value for a plurality of users corresponding to graph information for the plurality of users; and
 group the plurality of users into a plurality of viewing groups by comparing a plurality of representative values corresponding to the plurality of viewing groups with a representative value for each of the plurality of users.

5. The apparatus as claimed in claim 1, wherein the one or more computer programs further comprise computer-readable instructions to:
 based on a predetermined event being received from a terminal apparatus through the communication interface, identify the viewing group corresponding to the terminal apparatus; and
 provide at least one user information corresponding to the identified viewing group as the recommended user information.

6. The apparatus as claimed in claim 1, wherein the one or more computer programs further comprise computer-readable instructions to:
 based on a predetermined event being received from a terminal apparatus through the communication interface, generate a UI including the recommended content and the recommended user information; and transmit the generated UI to the terminal apparatus.

7. The apparatus as claimed in claim 1, wherein the predetermined event includes at least one of:
an event in which a recommended content is provided,
an event in which a user command for joint viewing is received,
an event in which a content that is currently viewed is terminated, or
an event in which a user input for viewing a new content is received.

8. The apparatus as claimed in claim 1, wherein the graph neural network model is a model trained by using at least one viewing content that has been viewed by a plurality of users as input learning data and using a viewing content that has been viewed by a plurality of users after viewing the at least one viewing content as output learning data.

9. A controlling method of an electronic apparatus, the method comprising:
obtaining graph information for a plurality of users in which viewing content is arranged in a time sequence based on content viewing history information for a plurality of users;
obtaining attribute information for each content by inputting the graph information for the plurality of users to a Graph Neural Network (GNN) model;
grouping the plurality of users into a plurality of viewing groups based on the graph information for the plurality of users and the attribute information for each content; and
providing recommended content based on content information corresponding to the plurality of viewing groups,
wherein the attribute information for each content comprises information regarding a viewing pattern for each of the plurality of users according to when the content was viewed,
wherein the graph information corresponds to a directed graph including nodes corresponding to the viewing content and edges corresponding to the time sequence,
wherein the GNN model is a neural network model trained using data in a form of a graph,
wherein the providing of the recommended content comprises:
obtaining prediction information for each content for each of the plurality of users based on graph information for the plurality of users and weighted value information for each of the plurality of viewing groups,
obtaining content information corresponding to the plurality of viewing groups based on the prediction information for content for each of the plurality of users; and
providing the recommended content based on the obtained content information, and
wherein the method further comprises:
based on a predetermined event being received from a terminal apparatus, identifying a viewing group corresponding to the terminal apparatus among the plurality of viewing groups, and
provide recommended user information corresponding to users in the identified viewing group to the terminal apparatus for a joint viewing function to watch content together with the users in the identified viewing group,
wherein the recommended user information includes information for selecting a counterpart to use the joint viewing function together, and
wherein the joint viewing function is a feature that allows the users to watch content simultaneously.

10. The method as claimed in claim 9, wherein the attribute information for each content includes information regarding a viewing pattern.

11. The method as claimed in claim 10, further comprising:
providing a User Interface (UI) including a text corresponding to the attribute information for each content related to a viewing pattern and information related to the recommended content.

12. The method as claimed in claim 9, wherein the grouping comprises:
obtaining a representative value for a plurality of users corresponding to graph information for the plurality of users; and
grouping the plurality of users into a plurality of viewing groups by comparing a plurality of representative values corresponding to the plurality of viewing groups with a representative value for each of the plurality of users.

13. The method as claimed in claim 9, wherein the providing of the recommended content comprises:
identifying recommended content for a particular user based on content information corresponding to a viewing group to which the particular user belongs; and
transmitting information related to the identified recommended content to a terminal apparatus of the particular user.

14. The method as claimed in claim 13, further comprising:
receiving, from the terminal, a request for a recommended content; and
transmitting, to the terminal, the requested content.

15. The method as claimed in claim 13, wherein the information related to the identified recommended content comprises at least one of:
a title of the identified recommend content,
a reproduction time of the identified recommended content, or
a thumbnail image corresponding to the identified recommended content.

16. The method as claimed in claim 9, wherein the grouping comprises:
assigning, for each of the plurality of users, a probability value that the user belongs to each of the plurality of groups; and
assigning each of the plurality of users to a corresponding group of the plurality of groups based on the probability value, the graph information for the plurality of users, and the attribute information for each content.

* * * * *